(12) United States Patent
Kajino et al.

(10) Patent No.: US 10,011,172 B2
(45) Date of Patent: Jul. 3, 2018

(54) WORK VEHICLE

(71) Applicant: ISEKI & CO., LTD., Ehime-ken (JP)

(72) Inventors: Yutaka Kajino, Ehime-ken (JP);
Shingo Fujioka, Ehime-ken (JP)

(73) Assignee: ISEKI & CO., LTD., Ehime-ken (JP)

( * ) Notice: Subject to any disclaimer, the term of this patent is extended or adjusted under 35 U.S.C. 154(b) by 193 days.

(21) Appl. No.: 15/205,510

(22) Filed: Jul. 8, 2016

(65) Prior Publication Data

US 2017/0008397 A1    Jan. 12, 2017

(30) Foreign Application Priority Data

Jul. 9, 2015 (JP) ................................. 2015-137786
Jul. 9, 2015 (JP) ................................. 2015-137787

(51) Int. Cl.
*B60K 17/28* (2006.01)
(52) U.S. Cl.
CPC ........... *B60K 17/28* (2013.01); *B60Y 2200/22* (2013.01); *B60Y 2200/221* (2013.01); *B60Y 2300/423* (2013.01)
(58) Field of Classification Search
CPC ................ B60K 17/28; B60Y 2200/22; B60Y 2200/221
See application file for complete search history.

(56) References Cited

U.S. PATENT DOCUMENTS 9,056,548 B2 * 6/2015 Kiyokawa ............... B60K 17/28
2010/0327144 A1 * 12/2010 Steffensen ............. B60K 17/28
248/671

FOREIGN PATENT DOCUMENTS

JP          2014-073829 A     4/2014

* cited by examiner

*Primary Examiner* — Faye M Fleming
(74) *Attorney, Agent, or Firm* — Studebaker & Brackett PC

(57) ABSTRACT

A work vehicle includes two types of PTO shafts, a PTO drive unit, a storage unit, a PTO gear shift operation unit, a PTO shaft detection sensor, a PTO gear shift sensor and a control device. The storage unit stores a PTO shaft, which is not connected to the driven portion, of the two types of PTO shafts. The PTO gear shift operation unit performs gear-shifting of the gear shift mechanism. The PTO shaft detection sensor detects a type of the PTO shaft stored in the storage unit. The PTO gear shift sensor detects an operation state of the PTO gear shift operation unit. The control device decides a propriety of a combination of a detection value of the PTO shaft detection sensor and a detection value of the PTO gear shift sensor.

18 Claims, 16 Drawing Sheets

WORK VEHICLE

CROSS-REFERENCE TO RELATED APPLICATIONS

The present application claims priority under 35 U.S.C. § 119 to Japanese Patent Applications No. 2015-137786, filed Jul. 9, 2015, and No. 2015-137787, filed Jul. 9, 2015. The contents of these applications are incorporated herein by reference in their entirety.

BACKGROUND

Field

The present invention relates to a work vehicle.

Related Art

Conventionally, work vehicles such as tractors have a PTO (power take-off) gear shift device for changing a rotational speed of a PTO shaft used to take off a rotational power from an engine. In such PTO gear shift devices, a PTO gear shift device is known, in which a PTO shaft is removable and thus, for example, two types of PTO shafts (high-speed rotation and low-speed rotation types) can be replaced and used depending on types of implements or the like to be connected to the work vehicle.

As work vehicles in which PTO shafts can be replaced in this way, a work vehicle is known, in which a PTO gear-shifting is locked on a high-speed position by means of a mechanical configuration in which a cam is pivoted when a low-speed rotation PTO shaft is stored in a PTO shaft storage unit (e.g., see Patent Document 1).

Patent Document 1: Japanese Patent Application Publication No. 2014-073829

However, in the conventional work vehicle as described above, because the cam which is a mechanical component is used, the cam is likely not to be pivoted if mud and the like attached on rear wheels is accumulated on the vicinity of the cam. Accordingly, a PTO gear-shifting is likely not to be locked on a position (in this case, a high-speed position) corresponding to a desired rotational speed.

SUMMARY

The present invention has been made keeping in mind the above problems, and an object thereof is to provide a work vehicle in which a PTO gear-shifting can be reliably performed.

In order to solve the above problems and to achieve the object, a first aspect of a work vehicle includes two types of PTO shafts (40) be configured to be selectively connected to a driven portion of a vehicle body; a PTO drive unit (20) having a gear shift mechanism (39) and configured to rotate a PTO shaft (40), which is connected to the driven portion, of the two types of PTO shafts (40) at a rotational speed gear-shifted by the gear shift mechanism (39); a storage unit (46) for storing a PTO shaft (40), which is not connected to the driven portion, of the two types of PTO shafts (40); a PTO gear shift operation unit (47) for performing gear-shifting of the gear shift mechanism (39); a PTO shaft detection sensor (80) for detecting a type of the PTO shaft (40) stored in the storage unit (46); a PTO gear shift sensor (90) for detecting an operation state of the PTO gear shift operation unit (47); and a control device (100) for deciding a propriety of a combination of a detection value of the PTO shaft detection sensor (80) and a detection value of the PTO gear shift sensor (90).

A second aspect of the work vehicle is characterized, in addition to the first aspect, in that the PTO gear shift operation unit (47) is arranged so that a base end thereof is connected to the gear shift mechanism (39) and a distal end thereof is located at a location allowing operation by an operator, and the PTO gear shift sensor (90) is arranged near to the base end of the PTO gear shift operation unit (47).

A third aspect of the work vehicle is characterized, in addition to the first aspect, in that one PTO shaft (40) of the two types of PTO shafts (40) has an abutment portion (44d) protruding axially from one end portion thereof, the storage unit (46) is formed in a cylindrical shape to axially store the PTO shaft (40) therein, and a pressing portion (82) of the PTO shaft detection sensor (80) is arranged at a location in the storage unit 46, at which the abutment portion (44d) is abutted on the pressing portion, when the one PTO shall (40) is inserted into the storage unit (46), starting with the abutment portion (44d).

A fourth aspect of the work vehicle is characterized, in addition to the second aspect, in that one PTO shaft (40) of the two types of PTO shafts (40) has an abutment portion (44d) protruding axially from one end portion thereof, the storage unit (46) is formed in a cylindrical shape to axially store the PTO shaft (40) therein, and a pressing portion (82) of the PTO shaft detection sensor (80) is arranged at a location in the storage unit (46), at which the abutment portion (44d) is abutted on the pressing portion, when the one PTO shaft (40) is inserted into the storage unit (46), starting with the abutment portion (44d).

A fifth aspect of the work vehicle is characterized, in addition to the third aspect, in that the PTO shaft detection sensor (80) is arranged on a bottom (55) side of the storage unit (46); the storage unit (46) is installed so that an insertion direction of the PTO shaft (40) is inclined; and holes (57, 58) is provided in a lower portion of a circumferential surface of the storage unit (46) in the installed state.

A sixth aspect of the work vehicle is characterized, in addition to the fourth aspect, in that the PTO shaft detection sensor (80) is arranged on a bottom (55) side of the storage unit (46); the storage unit (46) is installed so that an insertion direction of the PTO shaft (40) is inclined, and holes (57, 58) is provided in a lower portion of a circumferential surface of the storage unit (46) in the installed state.

A seventh aspect of the work vehicle is characterized, in addition to the first aspect, in that a PTO clutch (38) for selecting engagement or disengagement of a rotational power to be transmitted to the PTO shaft (40) is provided; the two types of PTO shafts (40) includes PTO shafts (40) of high-speed rotation and low-speed rotation types; the PTO gear shift operation unit (47) is configured to perform gear-shift operations, which respectively correspond to high-speed, neutral and low-speed positions, on the gear shift mechanism (39); and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

A eighth aspect of the work vehicle is characterized, in addition to the second aspect, in that a PTO clutch (38) for selecting engagement or disengagement of a rotational power to be transmitted to the PTO shaft (40) is provided; the two types of PTO shafts (40) includes PTO stuffs (40) of high-speed rotation and low-speed rotation types; the PTO gear shift operation unit (47) is configured to perform gear-shift operations, which respectively correspond to high-speed, neutral and low-speed positions, on the gear shift mechanism (39); and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

A ninth aspect of the work vehicle is characterized, in addition to the third aspect in that a PTO clutch (38) for selecting engagement or disengagement of a rotational power to be transmitted to the PTO shaft (40) is provided; the two types of PTO shafts (40) includes PTO shafts (40) of high-speed rotation and low-speed rotation types; the PTO gear shift operation unit (47) is configured to perform gear-shift operations, which respectively correspond to high-speed, neutral and low-speed positions, on the gear shift mechanism (39); and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

A tenth aspect of the work vehicle is characterized, in addition to the fourth aspect, in that a PTO clutch (38) for selecting engagement or disengagement of a rotational power to be transmitted to the PTO shaft (40) is provided; the two types of PTO shafts (40) includes PTO shafts (40) of high-speed rotation and low-speed rotation types; the PTO gear shift operation unit (47) is configured to perform gear-shift operations, which respectively correspond to high-speed, neutral and low-speed positions, on the gear shift mechanism (39); and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

A eleventh aspect of the work vehicle is characterized, in addition to the fifth aspect, in that a PTO clutch (38) for selecting engagement or disengagement of a rotational power to be transmitted to the PTO shaft (40) is provided; the two types of PTO shafts (40) includes PTO shafts (40) of high-speed rotation and low-speed rotation types; the PTO gear shift operation unit (47) is configured to perform gear-shift operations, which respectively correspond to high-speed, neutral and low-speed positions, on the gear shift mechanism (39); and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

A twelfth aspect of the work vehicle is characterized, in addition to the sixth aspect, in that a PTO clutch (38) for selecting engagement or disengagement of a rotational power to be transmitted to the PTO shaft (40) is provided; the two types of PTO shafts (40) includes PTO shafts (40) of high-speed rotation and low-speed rotation types; the PTO gear shift operation unit (47) is configured to perform gear-shift operations, which respectively correspond to high-speed, neutral and low-speed positions, on the gear shift mechanism (39); and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

A thirteenth aspect of the work vehicle is characterized, in addition to the seventh aspect, in that when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

A fourteenth aspect of the work vehicle is characterized, in addition to the eighth aspect, in that when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

A fifteenth aspect of the work vehicle is characterized, in addition to the ninth aspect, in that when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

A sixteenth aspect of the work vehicle is characterized, in addition to the tenth aspect, in that when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

A seventeenth aspect of the work vehicle is characterized, in addition to eleventh aspect, in that when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

A eighteenth aspect of the work vehicle is characterized, in addition to the twelfth aspect, in that when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

According to the first aspect of the work vehicle, because a type of a PTO shaft stored in the storage unit by the PTO shaft detection sensor can be electrically detected, a PTO gear-shifting is hardly influenced by mud and the like and thus can be reliably performed. Also, because an operation state of the PTO gear shift operation unit can be detected by the PTO gear shift sensor, the other PTO shaft and the operation state of the PTO gear shift operation unit can be electrically compared. Therefore, it can be easily found whether or not a PTO shaft corresponding to a rotational speed in accordance with a PTO gear-shifting is mounted. Further, because an operation state of the PTO gear shift operation unit can be detected by the PTO gear shift sensor, the other PTO shaft and the operation state of the PTO gear shift operation unit can be electrically compared. Therefore, it can be easily found whether or not a PTO shaft corresponding to a rotational speed in accordance with a PTO gear-shifting is mounted.

According to the second aspect of the work vehicle, because the PTO gear shift sensor is arranged near to the base end of the PTO gear shift operation unit, movement of the PTO gear shift operation unit can be directly and reliably detected.

According to the third aspect of the work vehicle, it can be reliably detected that a PTO shaft is stored in the storage unit.

According to the fourth aspect of the work vehicle, it can be reliably detected that a PTO shaft is stored in the storage unit.

According to the fifth aspect of the work vehicle, because water or oil can be discharged to the outside through the holes, the PTO shaft detection sensor can be prevented from having a failure due to an influence of water, oil and the like.

According to the sixth aspect of the work vehicle, because water or oil can be discharged to the outside through the holes, the PTO shaft detection sensor can be prevented from having a failure due to an influence of water, oil and the like.

According to the seventh aspect of the work vehicle, because when attempting to rotate a PTO shaft at a higher speed, a condition for engaging of the PTO clutch is that a low-speed rotation PTO shaft is stored in the storage unit, the low-speed rotation PTO shaft can be prevented from being rotated at a higher speed. Namely, it is possible to prevent an implement from being driven at a rotational speed, which does not correspond to the PTO shaft.

According to the eighth aspect of the work vehicle, because when attempting to rotate a PTO shaft at a higher speed, a condition for engaging of the PTO clutch is that a low-speed rotation PTO shaft is stored in the storage unit, the low-speed rotation PTO shaft can be prevented from being rotated at a higher speed. Namely, it is possible to prevent an implement from being driven at a rotational speed, which does not correspond to the PTO shaft.

According to the ninth aspect of the work vehicle, because when attempting to rotate a PTO shaft at a higher speed, a condition for engaging of the PTO clutch is that a low-speed rotation PTO shaft is stored in the storage unit, the low-speed rotation PTO shaft can be prevented from being rotated at a higher speed. Namely, it is possible to prevent an implement from being driven at a rotational speed, which does not correspond to the PTO shaft.

According to the tenth aspect of the work vehicle, because when attempting to rotate a PTO shaft at a higher speed, a condition for engaging of the PTO clutch is that a low-speed rotation PTO shaft is stored in the storage unit, the low-speed rotation PTO shaft can be prevented from being rotated at a higher speed. Namely, it is possible to prevent an implement from being driven at a rotational speed, which does not correspond to the PTO shaft.

According to the eleventh aspect of the work vehicle, because when attempting to rotate a PTO shaft at a higher speed, a condition for engaging of the PTO clutch is that a low-speed rotation PTO shaft is stored in the storage unit, the low-speed rotation PTO shaft can be prevented from being rotated at a higher speed. Namely, it is possible to prevent an implement from being driven at a rotational speed, which does not correspond to the PTO shaft.

According to the twelfth aspect of the work vehicle, because when attempting to rotate a PTO shaft at a higher speed, a condition for engaging of the PTO clutch is that a low-speed rotation PTO shaft is stored in the storage unit, the low-speed rotation PTO shaft can be prevented from being rotated at a higher speed. Namely, it is possible to prevent an implement from being driven at a rotational speed, which does not correspond to the PTO shaft.

According to the thirteenth aspect of the work vehicle, because when attempting to rotate a PTO shaft at a lower speed, a condition for prohibiting the PTO clutch from engaging is that a low-speed rotation PTO shaft is stored in the storage unit, the PTO shaft can be prevented from being rotated at a lower speed, when the low-speed rotation PTO shaft is not connected. Namely, it is possible to prevent an implement from being driven at a rotational speed, which does not correspond to the PTO shaft.

According to the fourteenth aspect of the work vehicle, because when attempting to rotate a PTO shaft at a lower speed, a condition for prohibiting the PTO clutch from engaging is that a low-speed rotation PTO shaft is stored in the storage unit, the PTO shaft can be prevented from being rotated at a lower speed, when the low-speed rotation PTO shaft is not connected. Namely, it is possible to prevent an implement from being driven at a rotational speed, which does not correspond to the PTO shaft.

According to the fifteenth aspect of the work vehicle, because when attempting to rotate a PTO shaft at a lower speed, a condition for prohibiting the PTO clutch from engaging is that a low-speed rotation PTO shaft is stored in the storage unit, the PTO shaft can be prevented from being rotated at a lower speed, when the low-speed rotation PTO shaft is not connected. Namely, it is possible to prevent an implement from being driven at a rotational speed, which does not correspond to the PTO shaft.

According to the sixteenth aspect of the work vehicle, because when attempting to rotate a PTO shaft at a lower speed, a condition for prohibiting the PTO clutch from engaging is that a low-speed rotation PTO shaft is stored in the storage unit, the PTO shaft can be prevented from being rotated at a lower speed, when the low-speed rotation PTO shaft is not connected. Namely, it is possible to prevent an implement from being driven at a rotational speed, which does not correspond to the PTO shaft.

According to the seventeenth aspect of the work vehicle as set forth in claim 17, because when attempting to rotate a PTO shaft at a lower speed, a condition for prohibiting the PTO clutch from engaging is that a low-speed rotation PTO shaft is stored in the storage unit, the PTO shaft can be prevented from being rotated at a lower speed, when the low-speed rotation PTO shaft is not connected. Namely, it is possible to prevent an implement from being driven at a rotational speed, which does not correspond to the PTO shaft.

According to the eighteenth aspect of the work vehicle as set forth in claim 18, because when attempting to rotate a PTO shaft at a lower speed, a condition for prohibiting the PTO clutch from engaging is that a low-speed rotation PTO shaft is stored in the storage unit, the PTO shaft can be prevented from being rotated at a lower speed, when the low-speed rotation PTO shaft is not connected. Namely, it is possible to prevent an implement from being driven at a rotational speed, which does not correspond to the PTO shaft.

DESCRIPTION OF THE EMBODIMENTS

Embodiments of a work vehicle disclosed in the present application will be now described in detail with reference to the accompanying drawings. It should be noted that the invention is not limited to embodiments as described below.

Figure 1:
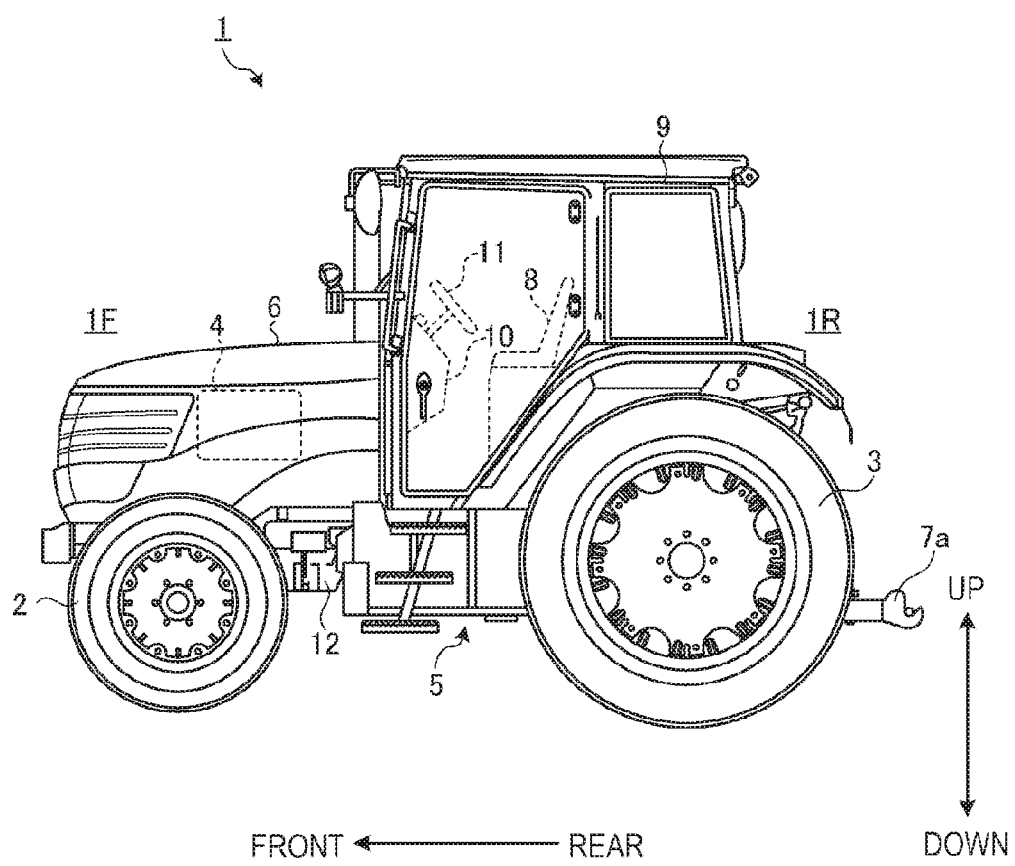
FIG. 1 is a schematic left side view of a work vehicle.
Figure 2:
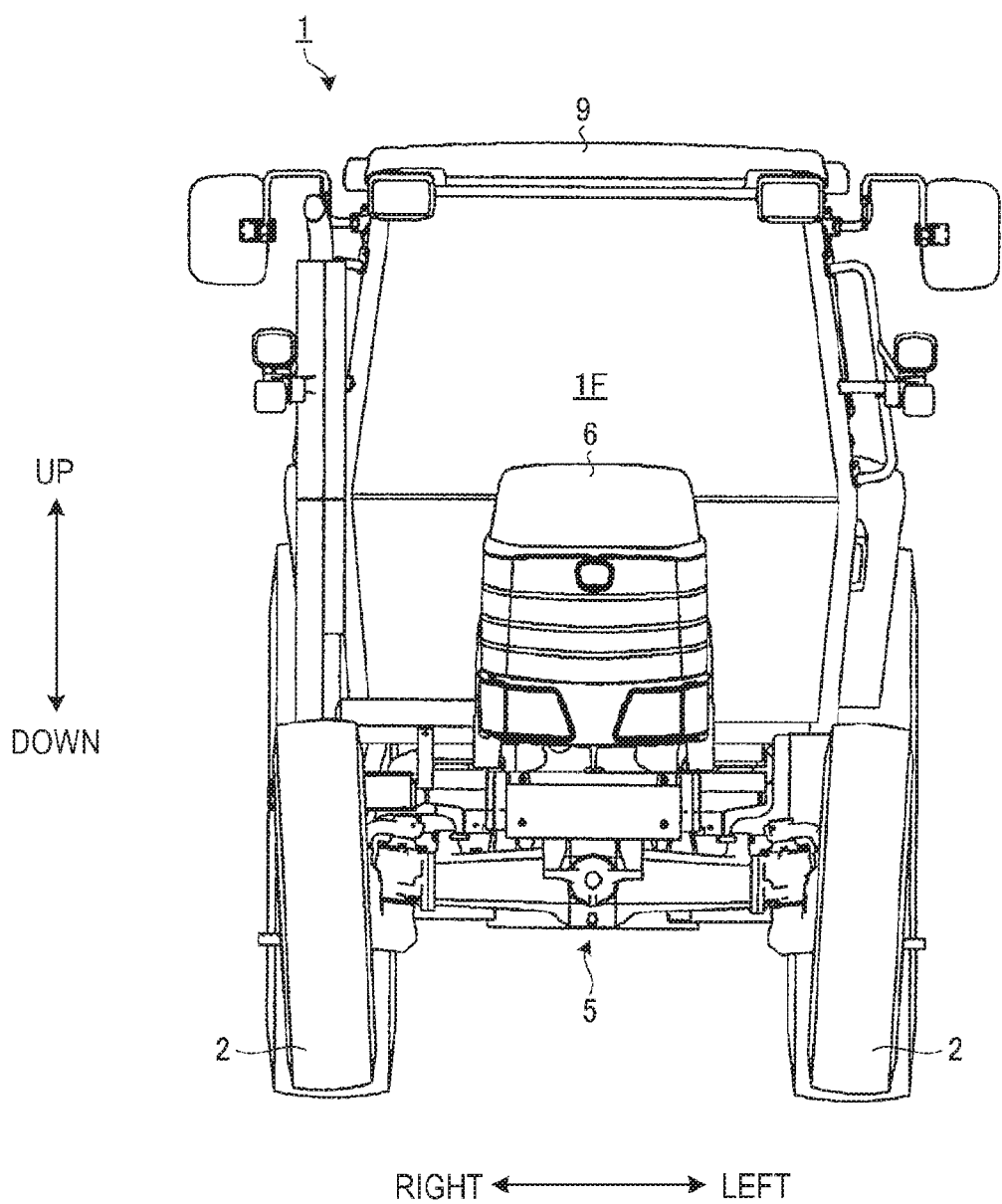
FIG. 2 is a schematic front view of the work vehicle.
Figure 3:
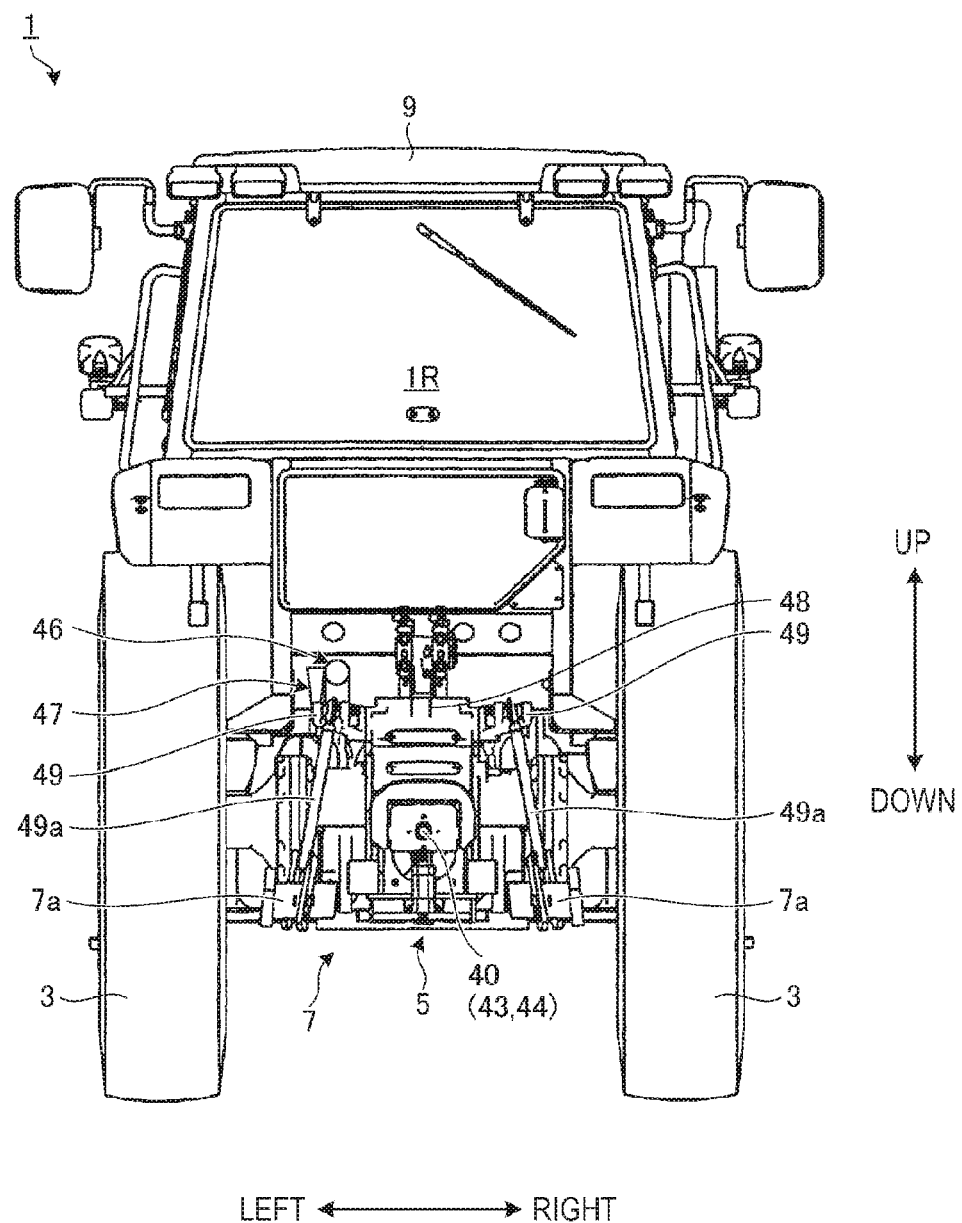
FIG. 3 is a schematic rear view of the work vehicle.
Figure 4:
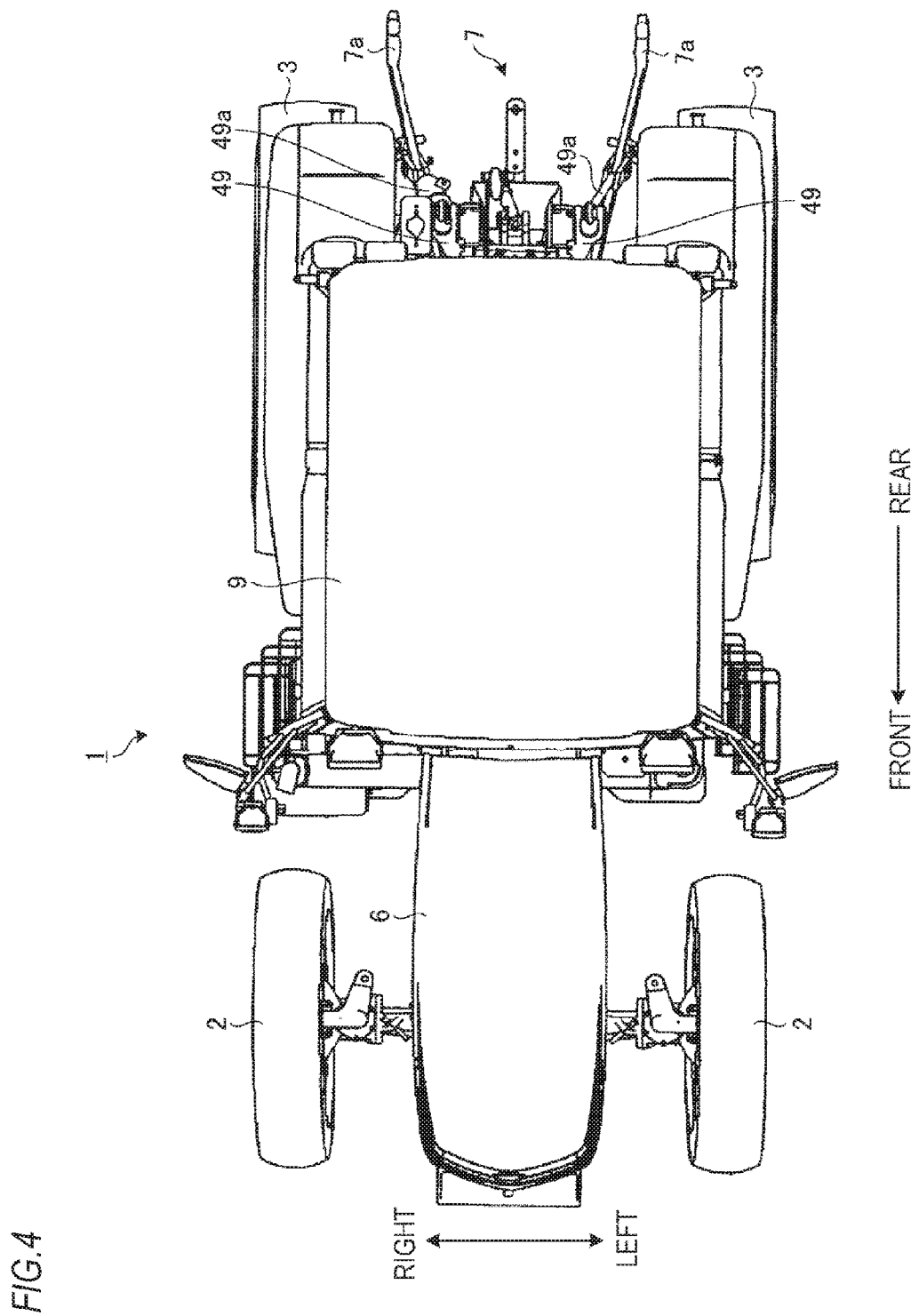
FIG. 4 is a schematic plan view of the work vehicle.

FIG. 1 is a schematic left side view of a work vehicle. FIG. 2 is a schematic front view of the work vehicle. FIG. 3 is a schematic rear view of the work vehicle. FIG. 4 is a schematic plan view of the work vehicle. Meanwhile, in the following description, a tractor 1 as the work vehicle will be described by way of example. The tractor 1 is an agricultural tractor which is a self-propelled type and is intended to perform a work in a farming field and the like. Also, in the following description, a front and rear direction is a running direction of the work vehicle, i.e., the tractor 1, when it goes straight, where the front side of the running direction is referred to as "front" in the front and rear direction and the rear side is referred to as "rear" in the front and rear direction. Herein, the running direction of the tractor 1 is a direction facing from an operator seat 8 toward a steering handle 11 when the tractor 1 goes straight.

Further, a left and right direction is a direction horizontally perpendicular to the front and rear direction. Herein, left and right sides are defined based on a state where one is facing the "front" side in the front and rear direction. Namely, in a state where an operator sits on the operator seat 8 and is facing the front side, a left hand side is the "left" side and a right hand side is the "right" side. Also, a vertical direction is a direction perpendicular to the front and rear direction and the left and right direction. Thus, the front and rear direction, the left and right direction and the vertical direction are three-dimensionally perpendicular to each other.

As shown in FIGS. 1 to 4, the tractor 1 as the work vehicle includes front wheels 2, rear wheels 3, an engine 4 as a power source, and a transmission device (transmission) 5. Of these, the front wheels 2 are mainly provided as wheels for steering, i.e., steering wheels. The rear wheels 3 are mainly provided as wheels for driving, i.e., driving wheels. The rear wheels 3 are configured so that a rotational power generated by the engine 4 mounted in a bonnet 6 of a front vehicle body portion 1F can be properly speed-reduced and transmitted thereto via the transmission device (transmission) 5. The rear wheels 3 as well as the front wheels 2 generate a driving force by a rotational power generated by the engine 4.

Also, the transmission device 5 is also configured to transmit the rotational power generated by the engine 4 to the front wheels 2 as necessary, and in this case, the front wheels 2 and rear wheels 3, in total four wheels sever as driving wheels to generate a driving force. Namely, the transmission device 5 can switch between two-wheel drive and four-wheel drive and also can reduce a rotational power of the engine 4 and then transmit the speed-reduced rotational power to the front wheels 2 and rear wheels 3. Also, the tractor 1 has a connection device 7 on which an implement such as a rotary cultivator (not shown) can be mounted, arranged on a vehicle body rear portion 1R thereof. The connection device 7 is configured to connect the implement to the vehicle body rear portion 1R of the tractor 1, for example, via left and right lower links 7a, a center top link or the like.

The tractor 1 is configured to lift or lower the implement via lift rods 49a, lower links 7a connected to the lift rods 49a and the like, for example, by hydraulically pivoting left and right lift arms 49. Also, the tractor 1 is configured so that the surrounding of the operator seat 8 on the vehicle body is covered with a cabin 9. The tractor 1 is configured to that, inside the cabin 9, a steering handle 11 is erected from a dashboard 10 in the front of the operator seat 8, and also various operation pedals, such as a clutch pedal, a brake pedal and an accelerator pedal, and various operation levers, such as a forward/reverse switching lever and a gear shift operation lever, are arranged in the vicinity of the operator seat 8.

Figure 5:
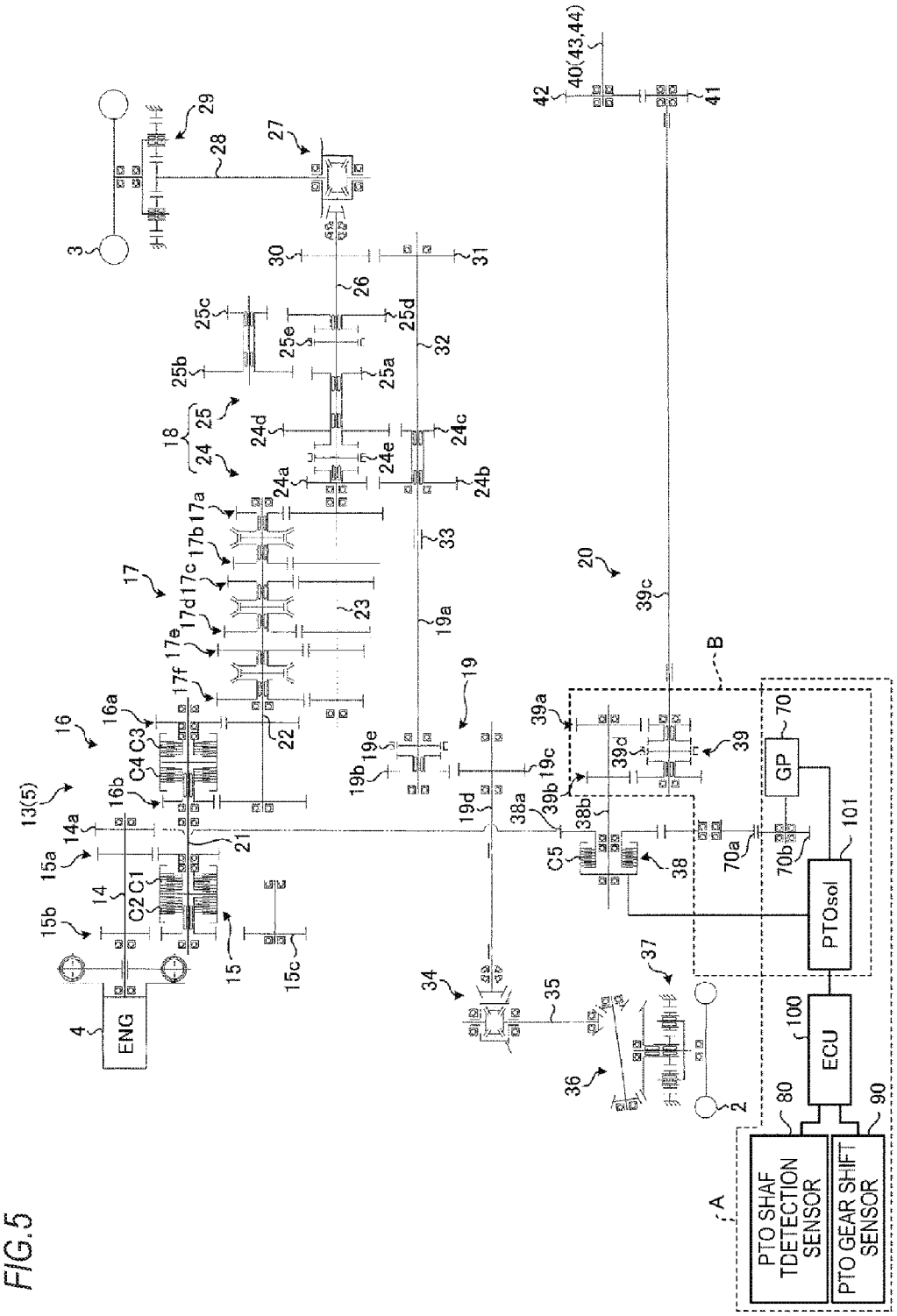
FIG. 5 is a diagram showing a power train of a transmission device.

Now, a power train 13 in a transmission case 12 of the transmission device 5 will be described with reference to FIG. 5. FIG. 5 is a diagram showing the power train 13 in the transmission case 12 of the transmission device 5. As shown in FIG. 5, the transmission device 5 includes the transmission case 12 (see FIG. 1) and the power train 13 arranged in the transmission case 12 and configured to transmit a rotational power from the engine 4 to the rear wheels 3 and the like. The power train 13 is intended to transmit a rotational power from the engine 4 to the front wheels 2, the rear wheels 3 and the implement mounted on the vehicle body and thus to drive them by the rotational power form the engine 4.

Specifically, the power train 13 includes an input shaft 14, a forward/reverse switching mechanism 15, a Hi-Lo gear shift mechanism 16 serving as a high-low gear shift mechanism, a main gear shift mechanism 17, a subsidiary gear shift mechanism 18, a 2WD/4WD selecting mechanism 19, a PTO drive unit (PTO drive mechanism) 20 and the like. The power train 13 transmits a rotational power generated by the engine 4 to the rear wheels 3 via the input shaft 14, the forward/reverse switching mechanism 15, the Hi-Lo gear shift mechanism 16, the main gear shift mechanism 17 and the subsidiary gear shift mechanism 18 in this order.

Also, the power train 13 transmits the rotational power generated by the engine 4 to the front wheels 2 via the input shaft 14, the forward/reverse switching mechanism 15, the Hi-Lo gear shift mechanism 16, the main gear shift mechanism 17, the subsidiary gear shift mechanism 18 and the 2WD/4WD selecting mechanism 19 in this order. Further, the power train 13 transmits the rotational power generated by the engine 4 to the implement via the input shaft 14 and the PTO drive mechanism 20 in this order.

The input shaft 14 is coupled to an output shaft of the engine 4 to allow the rotational power from engine 4 to be transmitted (inputted) thereto.

The forward/reverse switching mechanism 15 can switch the rotational power transmitted from the engine 4 into forward rotation or reverse rotation. The forward/reverse switching mechanism 15 includes a forward gear stage 15a, a reverse gear stage 15b, a counter rotating gear 15c, a hydraulic multi-plate clutch (forward clutch) C1, and a hydraulic multi-plate clutch (reverse clutch) C2. The hydraulic multi-plate clutches C1 and C2 can be switched into an engaged state or a disengaged state, thereby allowing a power transmission path in the forward/reverse switching mechanism 15 to be changed. Depending on whether the hydraulic multi-plate clutches C1 and C2 are in the engaged state or the disengaged state, the forward/reverse switching mechanism 15 changes the transmission path and then transmits therethrough the rotational power, which has been transmitted to the input shaft 14, to a counter shaft 21.

Also, if the hydraulic multi-plate clutch C1 is in the engaged state and the hydraulic multi-plate clutch C2 is in the disengaged state, the forward/reverse switching mechanism 15 transmit the rotational power, which has been transmitted to the input shaft 14, to the counter shaft 21 as forward rotation via the forward gear stage 15a and the hydraulic multi-plate clutch C1. If the hydraulic multi-plate clutch C1 is in the disengaged state and the hydraulic multi-plate clutch C2 is in the engaged state, the forward/reverse switching mechanism 15 transmits the rotational power, which has been transmitted to the input shaft 14, to the counter shaft 21 as reverse rotation via the reverse gear stage 15b, the counter rotating gear 15c and the hydraulic multi-plate clutch C2. Therefore, the forward/reverse switching mechanism 15 can switch between forward and reverse movements of the tractor 1.

Further, the forward/reverse switching mechanism 15 serves as a main clutch and thus becomes a neutral state when both hydraulic multi-plate clutches C1 and C are in the disengaged state, thereby interrupting power transmission to the front wheels 2 and rear wheels 3. The forward/reverse switching mechanism 15 can switch between forward, reverse and neutral stages by hydraulic control, for example, as an operator operates a forward/reverse switching lever (not shown). In addition, when a clutch pedal (not shown) is stepped on, both hydraulic multi-plate clutches C1 and C2 can become the disengaged state.

The Hi-Lo gear shift mechanism 16 is intended to speed-change the rotational power transmitted from the engine 4 into a high-speed stage or low-speed stage. The Hi-Lo gear shift mechanism 16 includes a Hi (high-speed) gear stage 16a, a Lo (low-speed) gear stage 16b, a hydraulic multi-plate clutch (Hi (high-speed) clutch) C3, and a hydraulic multi-plate clutch (Lo (low-speed) clutch) C4. The hydraulic multi-plate clutches C3 and C4 can be switched into an engaged state or a disengaged state, thereby allowing a power transmission path in the Hi-Lo gear shift mechanism 16 to be changed. Depending on whether the hydraulic multi-plate clutches C3 and C4 are in the engaged state or the disengaged state, the Hi-Lo gear shift mechanism 16 changes the transmission path and then transmits therethrough the rotational power, which has been transmitted to the counter shaft 21, to a gear shift shaft 22.

Also, if the hydraulic multi-plate clutch C3 is in the engaged state and the hydraulic multi-plate clutch C4 is in the disengaged state, the Hi-Lo gear shift mechanism 16 transmits the rotational power, which has been transmitted to the counter shaft 21, to the gear shift shaft 22 via the hydraulic multi-plate clutch C3 and the Hi gear stage 16a. If the hydraulic multi-plate clutch C3 is in the disengaged state and the hydraulic multi-plate clutch C4 is in the engaged state, the Hi-Lo gear shift mechanism 16 speed-changes and transmits the rotational power, which has been transmitted to the counter shaft 21, to the gear shift shaft 22 via the hydraulic multi-plate clutch C4 and the Lo gear stage 16b. Therefore, the Hi-Lo gear shift mechanism 16 can speed-change and transmit the rotational power from the engine 4 to the next stage at a gear ratio of the Hi gear stage 16a or a gear ratio of the Lo (low-speed) gear stage 16b. The Hi-Lo gear shift mechanism 16 can switch between Hi (high-speed) and Lo (low-speed) states by hydraulic control, for example, as an operator turns on or off a Hi-Lo selection switch (high/low gear shift operation switch), thereby performing gear-shifting into either one of two stages, i.e., the high-speed stage and the low-speed stage. Also, due to the configuration as described above, the Hi-Lo gear shift mechanism 16 can perform gear-shifting during running of the tractor 1.

The main gear shift mechanism 17 can speed-change the rotational power transmitted from the engine 4 into one of a plurality of gear shift stages. The main gear shift mechanism 17 is a synchromesh-type gear shift mechanism, and in this case, can speed-change the rotational power transmitted from engine 4 via the forward/reverse switching mechanism 15 and the Hi-Lo gear shift mechanism 16. The main gear shift mechanism 17 includes, as a plurality of gear shift stages, a first speed gear stage 17a, a second speed gear stage 17b, a third speed gear stage 17c, a fourth speed gear stage 17d, a fifth speed gear stage 17e and a sixth speed gear stage 17f.

Also, depending on which of the first to sixth speed gear stages 17a to 17f is coupled to the gear shift shaft 22, the main gear shift mechanism 17 speed-changes and transmits the rotational power, which has been transmitted to the gear shift shaft 22, to a gear shift shaft 23 via the corresponding one of the first and sixth speed gear stages 17a to 17f. Therefore, the main gear shift mechanism 17 can speed-change and transmit the rotational power from the engine 4 to the next stage at a gear ratio of the corresponding one of the first and sixth speed gear stages 17a to 17f. The main gear shift mechanism 17 can select one of the plurality of gear shift stages, for example, as an operator operates a main gear shift operation lever (not shown), thereby performing gear-shifting into one of six stages, i.e., the first to sixth speed gear stages 17a to 17f. Also, due to the configuration as described above, the main gear shift mechanism 17 can perform gear-shifting during running of the tractor 1.

The subsidiary gear shift mechanism 18 can speed-change the rotational power transmitted from engine 4 via the forward/reverse switching mechanism 15, the Hi-Lo gear shift mechanism 16 and the main gear shift mechanism 17 in this order. The subsidiary gear shift mechanism 18 includes a first subsidiary gear box 24 and a second subsidiary gear box 25 and the like and can speed-change and transmit the rotational power, which has been transmitted to the gear shift shaft 23, to a gear shift shaft 26 via the first subsidiary gear box 24, the second subsidiary gear box 25 and the like. The first subsidiary gear box 24 can speed-change the rotational power, which has been transmitted from the engine 4 and speed-changed by the main gear shift mechanism 17 and the like, into a high-speed stage or a low-speed stage and then can transmit the rotational power to the rear wheels 3, which are the drive wheels. The second subsidiary gear box 25 can speed-change the rotational power, which has been transmitted from engine 4 and speed-changed by the main gear shift mechanism 17 and the like, into a very low speed stage, which is lower than that in the first subsidiary gear box 24, and then can transmit the rotational power to the rear wheels 3, which are the drive wheels.

The first subsidiary gear box 24 of the subsidiary gear shift mechanism 18 includes a first gear 24a, a second gear 24b, a third gear 24c, a fourth gear 24d and a shifter 24e. The first gear 24a is integrally rotatably coupled to the gear shift shaft 23 and allows the rotational power from the gear shift shaft 23 to be transmitted (inputted) thereto. The second gear 24b engages with the first gear 24a. The third gear 24c is integrally rotatably coupled to the second gear 24b. The fourth gear 24d engages with the third gear 24c. The shifter 24e is intended to select whether or not to couple the gear shift shaft 26 to the first gear 24a or the fourth gear 24d. The shifter 24e can be moved to a Hi (high-speed) position where the first gear 24a and the gear shift shaft 26 are integrally rotatably coupled to each other, a Lo (low-speed) position where the fourth gear 24d and the gear shift shaft 26 are integrally rotatably coupled to each other, and a neutral position where the gear shift shaft 26 is not coupled to and thus disengaged from either first gear 24a or fourth gear 24d.

Also, the first subsidiary gear box 24 changes a transmission path depending on according to the positions of the shifter 24e and then transmits therethrough the rotational power, which has been transmitted to the gear shift shaft 23, to the gear shift shaft 26. When the shifter 24e is located at the Hi position, the first subsidiary gear box 24 transmits the rotational power, which has been transmitted to the gear shift shaft 23, from the first gear 24a to the gear shift shaft 26, not via the second gear 24b, the third gear 24c and the fourth gear 24d (i.e., gear shift shaft 23→first gear 24a→gear shift shaft 26). If the shifter 24e is located at the Lo position, the first subsidiary gear box 24 progressively speed-reduces and transmits the rotational power, which has been transmitted to the gear shift shaft 23, from the first gear 24a to the gear shift shaft 26 via the second gear 24b, the third gear 24c, the fourth gear 24d and the shifter 24e. Therefore, the first subsidiary gear box 24 speed-changes and transmits the rotational power from the engine 4 to the next stage at a gear ratio of the Hi (high-speed) gear stage, not via the second gear 24b, the third gear 24c and fourth gear 24d, or at a gear ratio of the Lo (low-speed) gear stage via the second gear 24b, the third gear 24c and the fourth gear 24d.

Further, if the shifter 24e is located at the neutral position, the first subsidiary gear box 24 becomes a state where both of the first gear 24a and the fourth gear 24d are idled relative to the gear shift shaft 26, namely a neutral state. The first subsidiary gear box 24 can switch between Hi (high-speed), Lo (low-speed) and neutral stages, for example, as an operator operates a first subsidiary gear box operation lever (not shown) to change positions of the shifter 24e.

The second subsidiary gear box 25 of the subsidiary gear shift mechanism 18 includes a first gear 25a, a second gear 25b, a third gear 25c, a fourth gear 25d and a shifter 25e. The first gear 25a is integrally rotatably coupled to the fourth gear 25d. The second gear 25b engages with the first gear 25a. The third gear 25c is integrally rotatably coupled to the second gear 25b. The fourth gear 25d engages with the third gear 25c. The shifter 25e is intended to select whether or not to couple the gear shift shaft 26 to the fourth gear 25d. The shifter 25e can be moved to a very Lo (very low speed) position where the fourth gear 25d and the gear shift shaft 26 are integrally rotatably coupled to each other, and a neutral position where the fourth gear 25d and the gear shift shaft 26 are not coupled to and thus disengaged from each other.

Also, the second subsidiary gear box 25 changes a transmission path depending on according to the positions of the shifter 25e and then transmits therethrough the rotational power, which has been transmitted to the gear shift shaft 23, to the gear shift shaft 26. When the first subsidiary gear box 24 is in the neutral state and also the shifter 25e is located at the Hi position, the first subsidiary gear box 25 progressively speed-reduces and transmits the rotational power, which has been transmitted to the gear shift shaft 23, from the first gear 24a of the first subsidiary gear box 24 to the gear shift shaft 26, via the second gear 24b, the third gear 24c and the fourth gear 24d of the first subsidiary gear box 24 and then via the first gear 25a, the second gear 25b, the third gear 25c, the fourth gear 25d and the shifter 25e of the second subsidiary gear box 25. Therefore, the second subsidiary gear box 25 can transmit the rotational power from the engine 4 to the next stage at a gear ratio of the very Lo (very low speed) gear stage via the second gear 24b, the third gear 24c, the fourth gear 24d, the first gear 25a, the second gear 25b, the third gear 25c and the fourth gear 25d.

Further, if the shifter 25e is located at the neutral position, the second subsidiary gear box 25 becomes a state where the fourth gear 25d is idled relative to the gear shift shaft 26, namely a neutral state. The second subsidiary gear box 25 becomes the neutral state when the first subsidiary gear box 24 is located at the Hi (high-speed) stage or Lo (low-speed) stage. The second subsidiary gear box 25 can switch between very Lo (very low speed) and neutral stages, for example, as an operator operates a second subsidiary gear box operation lever (not shown) to change positions of the shifter 25e.

As a result, by combining the first subsidiary gear box 24 and the second subsidiary gear box 25, the subsidiary gear shift mechanism 18 can speed-change the rotational power, which has transmitted to the gear shift shaft 23, into any one of three stages, i.e., the high speed, low speed and very low speed stages, and then can transmit the rotational power to the gear shift shaft 26. Namely, when the first subsidiary gear box 24 is at the Hi (high speed) stage and the second subsidiary gear box 25 is in the neutral state, the subsidiary gear shift mechanism 18 can be gear-shifted into the Hi (high speed) stage. If the first subsidiary gear box 24 is at the Lo (low speed) stage and the second subsidiary gear box 25 is in the neutral state, the subsidiary gear shift mechanism 18 can be gear-shifted into the Lo (low speed) stage. If the first subsidiary gear box 24 is in the neutral state and the second subsidiary gear box 25 is at the very Lo (very low speed) stage, the subsidiary gear shift mechanism 18 can be gear-shifted into the very Lo (very low speed) stage. The subsidiary gear shift mechanism 18 can switch between high speed, low speed and very low speed stages, in a state where the tractor 1 is stopped.

Then, the power train 13 of the transmission device 5 transmits the rotational power, which has transmitted to the gear shift shaft 26, to the rear wheels 3 via a rear wheel differential gear 27, an axle (drive shaft) 28, a planetary gear mechanism 29 and the like. As a result, the tractor 1 can be rotationally driven through the rotational power from engine 4 by the rear wheels 3 as the drive wheels.

To summarize the forgoing description, rotation of the input shaft 14 is first switched into forward rotation or reverse rotation in the forward/reverse switching mechanism 15, speed-changed into either one of two stages, i.e., the high speed and low speed stages, in the Hi-Lo gear shift mechanism 16, speed-changed into any one of six stages, i.e., the first to sixth speed gear stages 17a to 17f, in the main gear shift mechanism 17 and then speed-changed into any one of three stages, i.e., the high speed, low speed and very low speed stages, in the subsidiary gear shift mechanism 18, thereby finally being transmitted to the axle 28. In other words, rotation of the input shaft 14 is speed-changed into any one of 2×6×3=36 stages by the power train 13 of the transmission device 5 and then is transmitted to the axle 28.

The 2WD/4WD selecting mechanism 19 is intended to select whether or not to transmit the rotational power, which has been transmitted to the gear shift shaft 26, to the from wheels 2. The 2WD/4WD selecting mechanism 19 includes a transmitting shaft 19a, a first gear 19b, a second gear 19c, a transmitting shaft 19d, and a shifter 19e. The transmitting shaft 19a is configured so that the rotational power from the gear shift shaft 26 is transmitted (inputted) thereto via a gear 30, a gear 31, a transmitting shaft 32, a coupling 33 and the like. The transmitting shaft 19a is inserted into the first gear 19b and thus the first gear 19b is relatively rotatably mounted on the transmitting shaft 19a. The second gear 19c engages with the first gear 19b. The transmitting shaft 19d is integrally rotatably coupled to the second gear 19c. The shifter 19e is intended to select whether or not to couple the transmitting shaft 19a to the first gear 19b. The shifter 19e can be moved to a 4WD position where the transmitting shaft 19a and the first gear 19b are integrally rotatably coupled to each other, and a 2WD position (neutral position), where the transmitting shaft 19a and the first gear 19b are not coupled to and thus disengaged from each other. When the shifter 19e is located at the 4WD position, the 2WD/4WD selecting mechanism 19 transmits the rotational power, which has been transmitted to the transmitting shaft 19a, to the transmitting shaft 19d via the first gear 19b and the second gear 19c. Therefore, the 2WD/4WD selecting mechanism 19 can transmit the rotational power from the engine 4 to the front wheels 2.

The power train 13 of the transmission device 5 transmits the rotational power, which has been transmitted to the transmitting shaft 19d, to the front wheels 2 via a front wheel differential gear 34, an axle (drive shaft) 35, a vertical shaft 36, a planetary gear mechanism 37 and the like. As a result, because the front wheels 2 and the rear wheels 3 are rotationally driven as drive wheels through the rotational power from the engine 4, the tractor 1 can run in a four-wheel drive mode. When the shifter 19e is located at the 2WD position, the 2WD/4WD selecting mechanism 19 can interrupt transmission of the rotational power, which has been transmitted to the transmitting shaft 19a, to the transmitting shaft 19d. As a result, the tractor 1 can run in a two-wheel drive mode. The 2WD/4WD selecting mechanism 19 can switch between two-wheel drive and four-wheel drive modes, for example, as an operator operates a 2WD/4WD switching lever to change positions of the shifter 19e.

The PTO drive mechanism 20 is intended to speed-change and output the rotational power, which has been transmitted from the engine 4, to the implement through a PTO shaft 40 (see FIG. 3) at the vehicle body rear portion 1R (see FIG. 3), thereby driving the implement through the power from the engine 4. The PTO drive mechanism 20 includes a PTO clutch (PTO clutch mechanism) 38, a gear shift mechanism (PTO gear shift mechanism) 39, a PTO shaft 40 and the like.

The PTO clutch mechanism 38 is intended to switch between transmission and interruption of power to the PTO shaft 40. The PTO clutch mechanism 38 includes a gear 38a, a hydraulic multi-plate clutch C5 and a transmitting shaft 38b. The gear 38a engages with a first gear 41, which is integrally rotatably coupled to the input shaft 14. The hydraulic multi-plate clutch C5 is intended to select whether or not to allow transmission of power between the gear 38a and the transmitting shaft 38b, depending on whether the hydraulic multi-plate clutch C5 is switched into an engaged state or a disengaged state.

Also, when the hydraulic multi-plate clutch C5 is in the engaged state, the PTO clutch mechanism 38 becomes a PTO drive state where transmission of power to the PTO shaft 40 is allowed, and thus allows the rotational power, which has been transmitted from the input shaft 14 to the gear 38a via a first gear 41, to be transmitted to the transmitting shaft 38b via the hydraulic multi-plate clutch C5. Also, if the hydraulic multi-plate clutch C5 is in the disengaged state, the PTO clutch mechanism 38 becomes a PTO non-drive state (neutral state) where transmission of power to PTO shaft 40 is interrupted, and thus transmission of the rotational power, which has been transmitted to the gear 38a, to the transmitting shaft 38b is interrupted. The PTO clutch mechanism 38 can be switched between the PTO drive state and the PTO non-drive state by hydraulic control, for example, as an operator turns on or off a PTO selection switch. In addition, the tractor 1 is provided with a gear pump 70, which is constituted of a gear 70a engaged with the gear 38a, a gear 70b engaged with the gear 70a and the like. The gear pump 70 is intended to supply a hydraulic pressure to hydraulic systems such as the power train 13.

The PTO gear shift mechanism 39 is intended to perform speed-changing when power is transmitted to the PTO shaft 40. The PTO gear shift mechanism 39 includes a Hi (high-speed) gear stage 39a, a Lo (low-speed) gear stage 39b, a transmitting shaft 39c and a shifter 39d. The PTO gear shift mechanism 39 speed-changes and transmits the rotational power, which has been transmitted to the transmitting shaft 38b, to the transmitting shaft 39c via the Hi gear stage 39a or the Lo gear stage 39b, depending on a position of the shifter 39d. The shifter 39d is intended to select whether or not to connect the transmitting shaft 39c to the Hi gear stage 39a or the Lo gear stage 39b. The shifter 39d can be moved to a Hi (high-speed) position where the Hi gear stage 39a and the gear shift shaft 39c are coupled to each other, a Lo (low-speed) position where the Lo gear stage 39b and the transmitting shaft 39c are coupled to each other, and a neutral position where the transmitting shaft 39c is not coupled to and thus disengaged from either Hi gear stage 39a or Lo gear stage 39b.

Also when the shifter 39d is located at the Hi position, the PTO gear shift mechanism 39 transmits the rotational power, which has been transmitted to the transmitting shaft 38b, to the transmitting shaft 39c via the Hi gear stage 39a. If the shifter 39d is located at the Lo position, the PTO gear shift mechanism 39 transmits the rotational power, which has been transmitted to the transmitting shaft 38b, to the transmitting shaft 39c via the Lo gear stage 39b. Therefore, the PTO gear shift mechanism 39 can speed-change and transmit the rotational power from the engine 4 to the next stage at a gear ratio of the Hi gear stage 39a or at gear ratio of the Lo gear stage 39b. Also, if the shifter 39d is located at the neutral position, the PTO gear shift mechanism 39 becomes a state where both of the Hi gear stage 39a and the Lo gear stage 39b are idled relative to the transmitting shaft 39c, namely a neutral state. The PTO gear shift mechanism 39 can switch between Hi (high-speed), Lo (low-speed) and neutral stages, for example, as an operator operates a PTO gear shift operation unit (PTO gear shift operation lever) 47, as described below, to change positions of the shifter 39d, thereby performing gear-shifting into either one of two stages, i.e., the high-speed stage and the low-speed stage.

The PTO shaft 40 is intended to be connected to a driven portion of the implement connected to the vehicle body rear portion 1R and thus to transmit the rotational power from the engine 4 to the implement. The rotational power transmitted to the transmitting shaft 39c is transmitted to the PTO shaft 40 via a first gear 41, a second gear 42 and the like, and thus the PTO shaft 40 is rotationally driven.

To summarize the forgoing description, rotation of the input shaft 14 can be transmitted to the PTO gear shift mechanism 39 via the PTO clutch mechanism 38, speed-changed into either one of two stages, i.e., the high-speed stage and the low-speed stage, in the PTO gear shift mechanism 39, and then transmitted to the PTO shaft 40, thereby driving the implement. As a result, the tractor 1 can drive the implement by speed-changing and outputting the rotational power, which has been transmitted from the engine 4, to the implement through the PTO shaft 40. Meanwhile, in the power train 13 of FIG. 5, a configuration of a section A in the figure will be described below. Also, a configuration of a section B in the figure will be described below with reference to FIG. 16.

Figure 6:
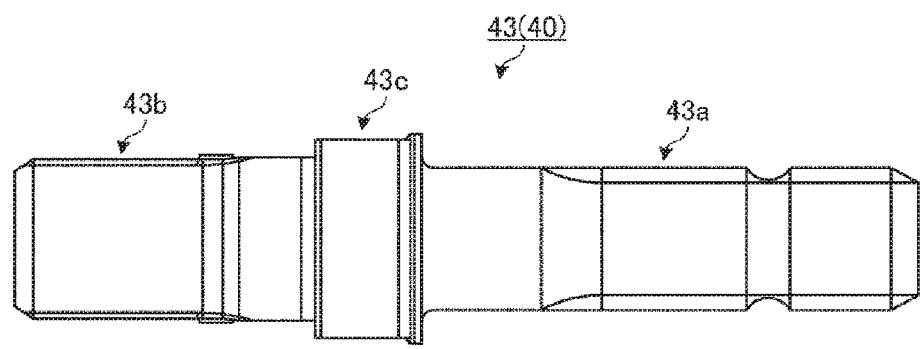
FIG. 6 is a schematic side view of a high-speed rotation PTO shaft.
Figure 7:
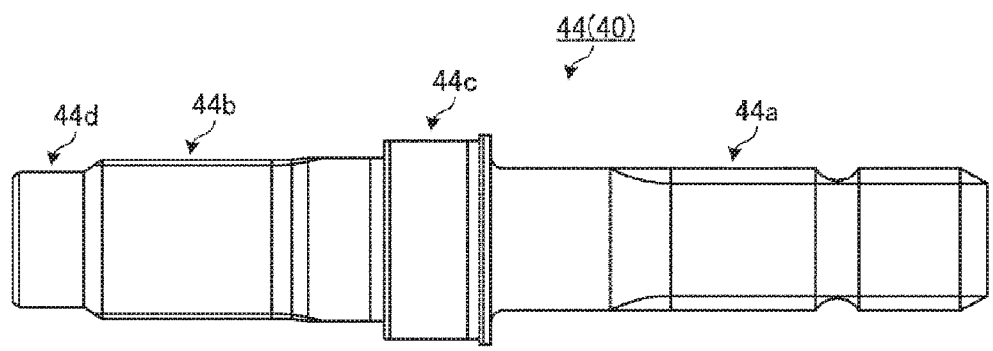
FIG. 7 is a schematic side view of a low-speed rotation PTO shaft.

Further, the PTO drive mechanism 20 is configured so that the PTO shaft 40 is removable and thus, for example, two types of PTO shafts 40 can be replaced and used depending on types of implements or the like. In the present embodiment, a first PTO shaft 43 illustrated in FIG. 6 and a second PTO shaft 44 illustrated in FIG. 7 are included in two types of PTO shafts 40. Namely, the tractor 1 of the present embodiment is configured so that the PTO shaft 43 and the PTO shaft 44 are replaced and used.

Figure 8:
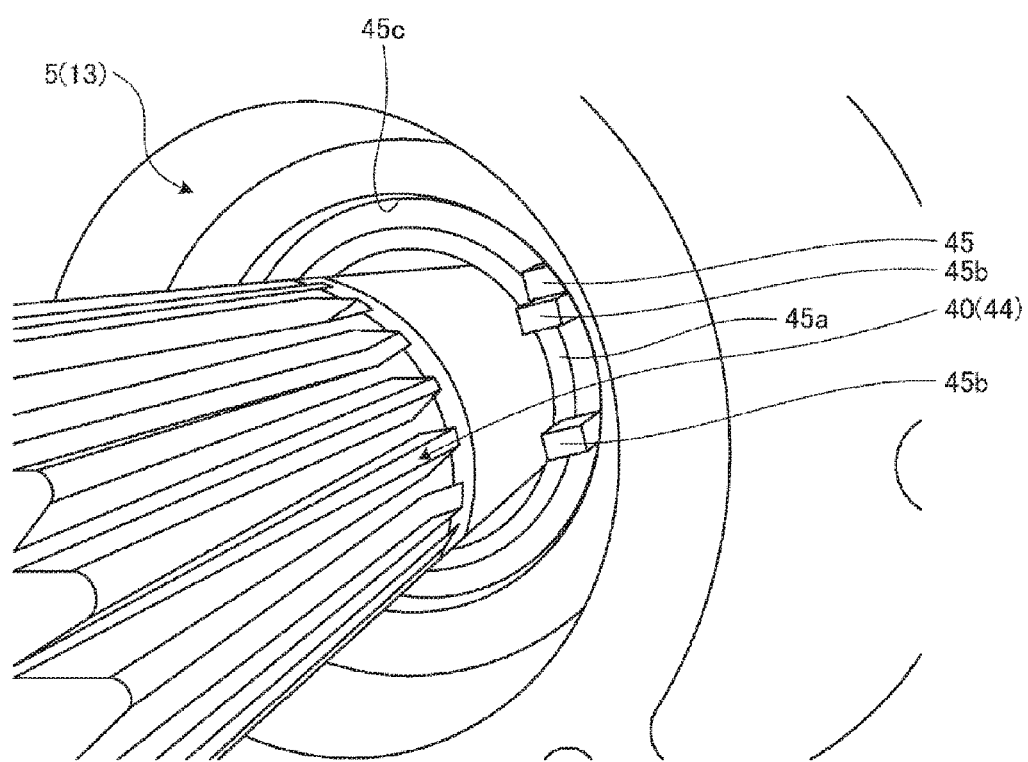
FIG. 8 is a partial perspective view showing a PTO shaft and a removable ring.

Now, the PTO shaft 40 (43, 44) will be described in detail with reference to FIGS. 6 to 8. FIG. 6 is a schematic side view of a high-speed rotation PTO shaft 43 (40). FIG. 7 is a schematic side view of a low-speed rotation PTO shaft 44 (40). FIG. 8 is a partial perspective view showing the PTO shaft 40 (e.g., the low-speed rotation PTO shaft 44) and a removable ring 45. As shown in FIG. 6, the high-speed rotation PTO shaft 43 is coupled with an implement, for example, via a hexagon spline 43a. Also, as shown in FIG. 7, the lower speed rotation shaft 44 is coupled with an implement, for example, via a 21-tooth involute spline 44a. As described above, the PTO shaft 43 and the PTO shaft 44 are mounted on a portion, which is located in the vehicle body rear portion 1R, of a main body of the power train 13 of the transmission device 5 (see FIG. 3). In this case, both of the PTO shaft 43 and the PTO shaft 44 are configured so that attachment end portions 43b and 44b opposite to the hexagon spline 43a and the involute spline 44a are rotatably mounted on the main body of the power train 13 via splines. Also, both of the PTO shaft 43 and the PTO shaft 44 have large-diameter portions 43c and 44c at middle portions thereof.

Also, the PTO shaft 43 and the PTO shaft 44 have generally the same exterior shape, but the PTO shaft 44 is provided with an abutment portion 44d protruding axially from the attachment end portions 44b and has a length longer than that of the PTO shaft 43. Typically the high-speed rotation PTO shaft 43 is used in a case where among of two stages, i.e., the high-speed stage and the low-speed stage, by the PTO gear shift mechanism 39, rotational driving at a higher speed (1000 rpm) is performed, but, for example, in terms of a strength at a connection site to the implement, is not used in a case where rotational driving at a lower speed is performed, in other words, a case where a higher torque is transmitted. Contrarily, the low-speed rotation PTO shaft 44 is used in a case where rotational driving at a lower speed (540 rpm) is performed. Meanwhile, in the following description, the PTO shaft 43 and the PTO shaft 44 will be simply referred to as "PTO shaft 40", if there is no need to particularly distinguish between them.

As shown in FIG. 8, the PTO shaft 40 (e.g., low-speed rotation PTO shaft 44) is removably mounted on a portion, which is located in the vehicle body rear portion 1R (see FIG. 3), of the power train 13 of the transmission device 5 via a removable ring 45 as illustrated in the figure. The removable ring 45 is formed in the shape of a circular ring with a notch 45a fainted in a part thereof, and grasping projections 45b are provided on edges of the notch 45a. The PTO shaft 44 is mounted to be rotatably inserted in the power train 13, but to be prevented from being dropped out of the main body of the power train 13 by the removable ring 45 fitted into a fitting groove 45c. Also, the PTO shaft 40 can be simply removed from the main body of the power train 13, as an operator bends the removable ring 45 while grasping the grasping projections 45b and then removes the removable ring 45 from the fitting groove 45c. In this way, the tractor 1 allows the operator to easily replace the PTO shaft 40, thereby enhancing operability and thus efficiency of operation.

Also, as shown in FIG. 3, the tractor 1 have a storage unit 46, in which when one of two types of PTO shafts 40 is being used, the other which is not mounted on the vehicle body can be stored, and a PTO gear shift operation lever 47 for gear shift operation of the PTO drive mechanism 20.

Figure 9:
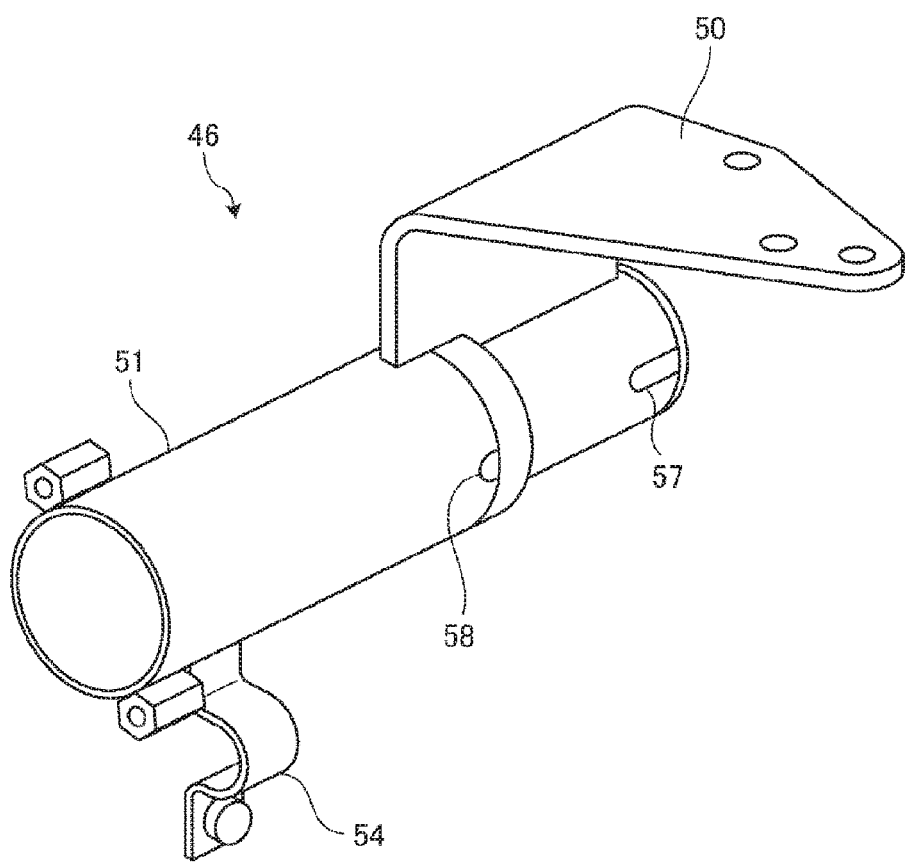
FIG. 9 is a schematic perspective view of a storage unit.
Figure 10:
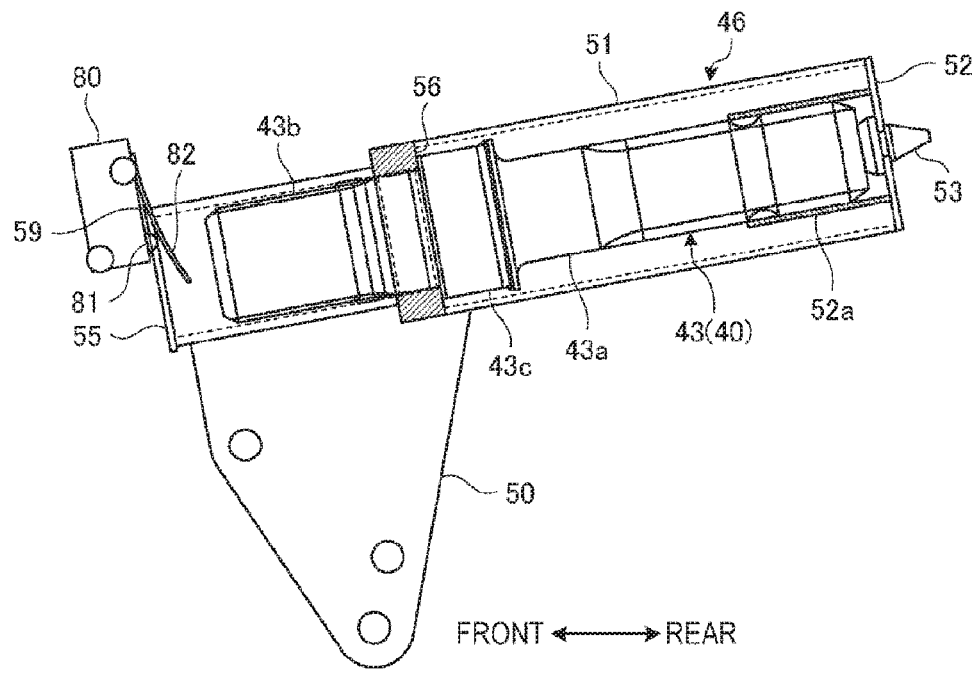
FIG. 10 is a schematic side view showing a stored state of the high-speed rotation PTO shaft.
Figure 11:
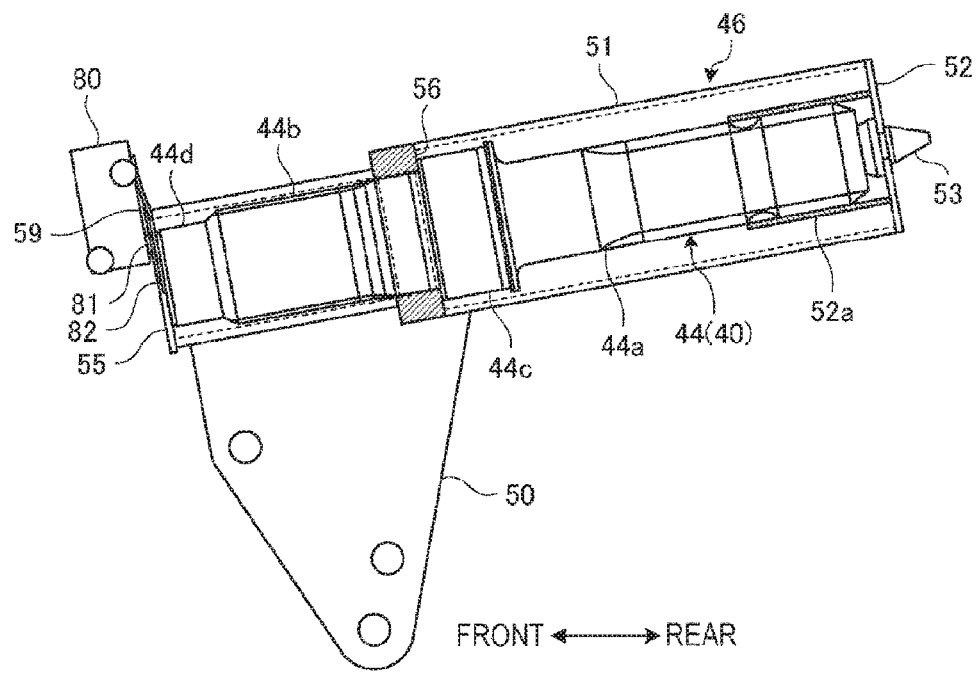
FIG. 11 is a schematic side view showing a stored state of the low-speed rotation PTO shaft.

Next, the storage unit 46 will be described in detail with reference to FIGS. 9 to 11. FIG. 9 is a schematic perspective view of a storage unit 46. FIG. 10 is a schematic side view showing a stored state of the high-speed rotation PTO shaft 43. FIG. 11 is a schematic side view showing a stored state of the low-speed rotation PTO shaft 44. As described above, the storage unit 46 is intended to store the PTO shaft 40 therein and is supported in the vehicle body rear portion 1R by a cylinder case 48 as a fixing portion (see FIG. 3).

The cylinder case 48 is fixed above the transmission case 12 of the transmission device 5 and has a pair of lift arms 49 freely pivotally provided on left and right sides thereof (see FIGS. 3 and 4). The lift arms 49 are configured to be pivotally lifted when a working fluid is supplied to a hydraulic cylinder provided in the cylinder case 48, and contrarily to be lowered when the working fluid is discharged. On a left surface of the cylinder case 48 configured in this way, the storage unit 46 is fixed and supported via a bracket 50 and the like (see FIG. 9).

As shown in FIG. 9, the storage unit 46 includes a cylindrical case 51 and a cover 52 (see FIGS. 10 and 11). The cylindrical case 51 is formed in the shape of a hollow bottomed cylinder and has an inner diameter sized to allow the PTO shaft 43 and the PTO shaft 44 to be stored therein. The cylindrical case 51 is supported on the cylinder case 48 so that a center axis of the cylinder shape is inclined with respect to a horizontal direction (see FIG. 12). Namely, the cylindrical case 51 is arranged along a tilted direction so that a front end portion thereof is positioned downward and a rear end portion is positioned upward. Also, the storage unit 46 is configured so that the cover 52 is fastened on the rear end portion of the cylindrical case 51 by a fly nut 53 (see FIGS. 10 and 11) and the like. When storing the PTO shaft 43 or the PTO shaft 44, the storage unit 46 allows the PTO shaft 43 or the PTO shaft 44 to be inserted therein through an opening of the rear end portion as the fly nut 53 is removed and then the cover 52 is removed. Therefore, the PTO shafts 43 and 44 can be stored into and also withdrawn from the storage unit 46 from the rear side of the tractor 1.

Figure 13:
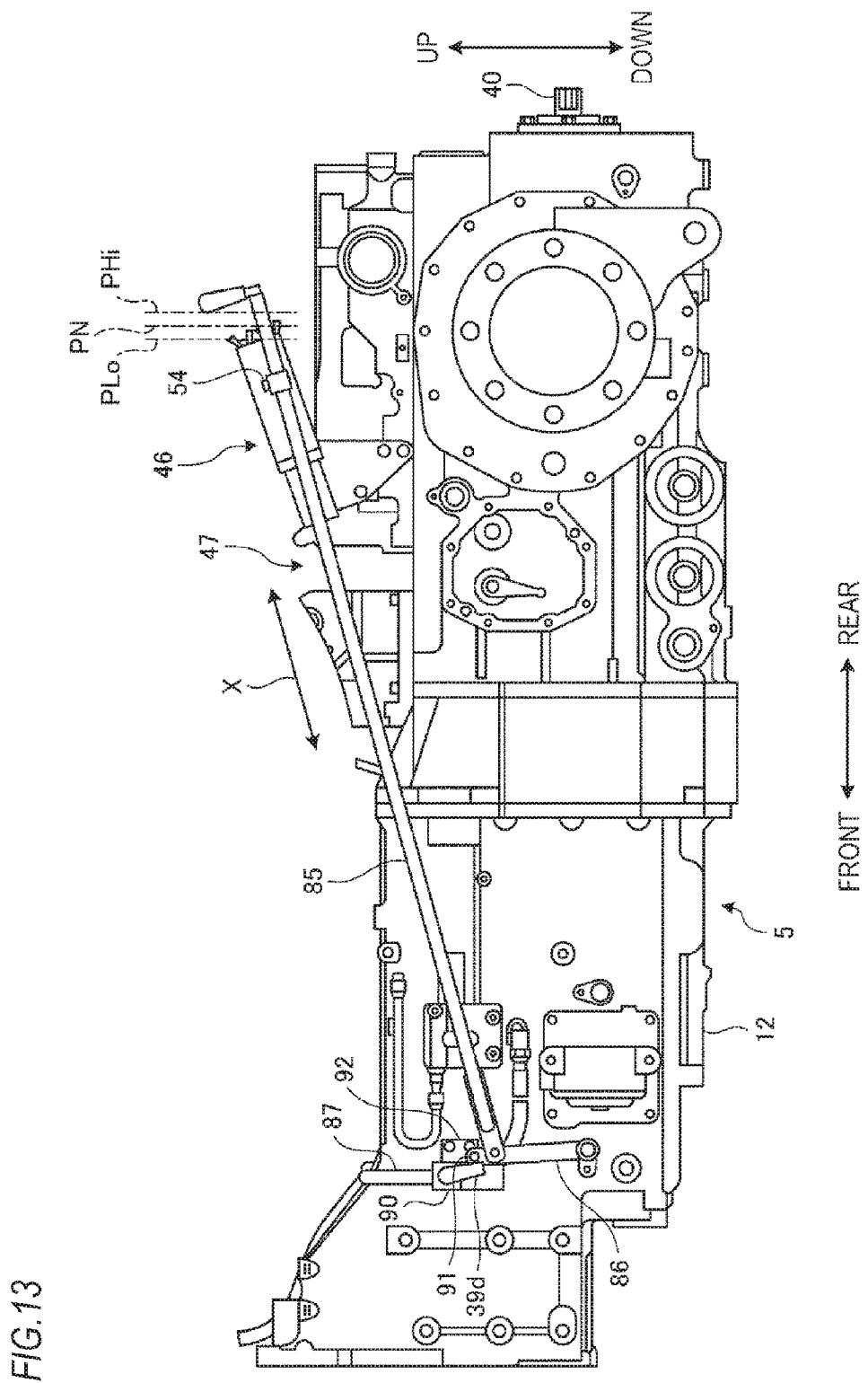
FIG. 13 is an explanatory view showing an operation of operating a PTO gear shift operation lever toward a high-speed position.

Also the storage unit 46 has a slide guide portion 54 provided on a circumferential surface of the cylindrical case 51 to slidably receive a rod portion 85 of the PTO gear shift operation unit 47 (see FIG. 13). An inner circumference of the storage unit 46 is formed so that an inner diameter thereof is reduced as it goes further from a middle portion 56 as a boundary. Also, as described below, when the PTO shaft 40 (43, 44) is stored in the storage unit 46, the attachment end portion 43b or 44b is inserted from the middle portion 56 toward a bottom 55 side (see FIGS. 10 and 11). Further, in the cylindrical case 51, holes 57 and 58 for mainly discharging water are provided at a middle location and a front distal location on a lower portion of the circumferential surface in an installed state thereof. In addition, the holes 57 and 58 are provided at locations diametrically symmetrical with respect to a notch 59 as described below.

As shown in FIG. 10, in a case where the high-speed rotation PTO shaft 43 (40) is stored in the storage unit 46, the PTO shaft 43 can be introduced toward the bottom 55 side due its own weight if the PTO shaft 43 is inserted therein from the rear side, because the storage unit 46 is installed in an downward-inclined state. Also, as described above, the PTO shaft 43 is configured so that the attachment end portion 43b is inserted from the middle portion 56 toward the bottom 55 side, because the large-diameter portion 43c is abutted on the middle portion 56. Herein, the cover 52 is provided with a cylindrical portion 52a on a surface thereof facing the opening of the cylindrical case 51 in an attached state. The cylindrical portion 52a has an outer diameter smaller than the inner diameter of the storage unit 46 (cylindrical case 51) and an inner diameter larger than the outer diameter of the PTO shaft 43. Also, the inner diameter of the cylindrical portion 52a is designed to be larger than the hexagon spline 43a but smaller than the attachment end portion 43b, so that the cover 52 cannot be attached if the PTO shaft 43 is reversely inserted, thereby preventing the reverse insertion of the PTO shaft 43.

Further, as shown in FIG. 11, in a case where the low-speed rotation PTO shaft 44 (40) is stored in the storage unit 46, like the PTO shaft 43 as described above, the PTO shaft 44 can be also introduced toward the bottom 55 side due its own weight if the PTO shaft 44 is inserted therein from the rear side, because the storage unit 46 is installed in an downward-inclined state. Also, as described above, the PTO shaft 44 is configured so that the attachment end portion 44b and the abutment portion 44d are inserted from the middle portion 56 toward the bottom 55 side, because the large-diameter portion 44c is abutted on the middle portion 56. Further, the inner diameter of the cylindrical portion 52a is larger than the outer diameter of the PTO shaft 44. In addition, the inner diameter of the cylindrical portion 52a is designed to be larger than the involute spline 44a but smaller than the attachment end portion 44b, so that the cover 52 cannot be attached if the PTO shaft 44 is reversely inserted, thereby preventing the reverse insertion of the PTO shaft 44.

As shown in FIGS. 10 and 11, a PTO shaft detection sensor 80 for detecting types of PTO shafts 40, i.e., whether the high-speed rotation PTO shaft 44 or the low-speed rotation PTO shaft 44, is arranged near to the bottom 55 of the storage unit 46 (in the front of an outer surface of the bottom 55). The PTO shaft detection sensor 80 has a sensing portion 81 and a pressing portion 82. The sensing portion 81 and the pressing portion 82 are arranged in the notch 59 cut out from an upper portion of the bottom 55 of the storage unit 46 to a center portion thereof. Namely, the PTO shaft detection sensor 80 is arranged at a location in the storage unit 46, at which the abutment portion 44d is abutted thereon, when the low-speed rotation PTO shaft 44 is inserted into the storage unit 46, starting with the abutment portion 44d.

In addition, the pressing portion 82 is provided so that a distal end thereof, which is a free end, faces downward. Therefore, it is possible to prevent mud and the like from being accumulated on the pressing portion 82 and thus to prevent a problem in operation of the pressing portion 82 from being occurred. Also, because water, oil and the like can be discharged to the outside of the cylindrical case 51 through the holes 57 and 58 provided in the storage unit 46, a failure in the PTO shaft detection senor 80 can be prevented. Further, the PTO shaft 43 or 44, which is not being used, is inhibited from rusting. Further, the PTO shaft 44 is held with the large-diameter portion 44c abutted on the storage unit 46, thereby preventing the entire weight of the PTO shaft 44 from being exerted on the PTO shaft detection sensor 80. Further, although not shown, a harness and the like of the PTO shaft detection sensor 80 are clamped on a floor 95 of the vehicle body (see FIG. 12) located above the PTO shaft detection sensor 80. In addition, although not shown, the PTO shaft detection sensor 80 is located in the rear of an exterior hydraulic valve and also inside a rear fender cover, thereby preventing mud and the like from being directly smeared thereon.

Figure 12:
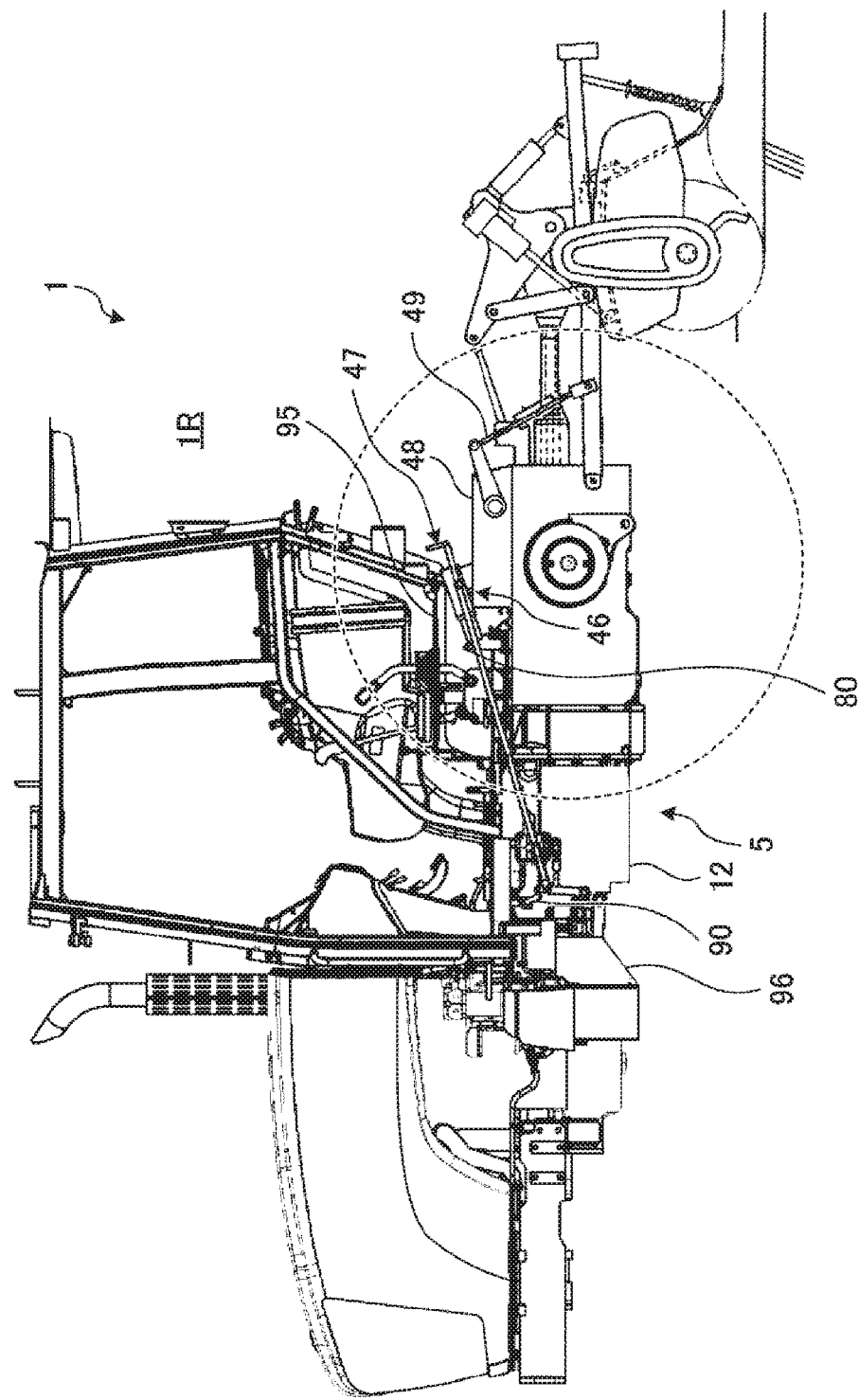
FIG. 12 is an explanatory view showing arrangement of a transmission case.
Figure 14:
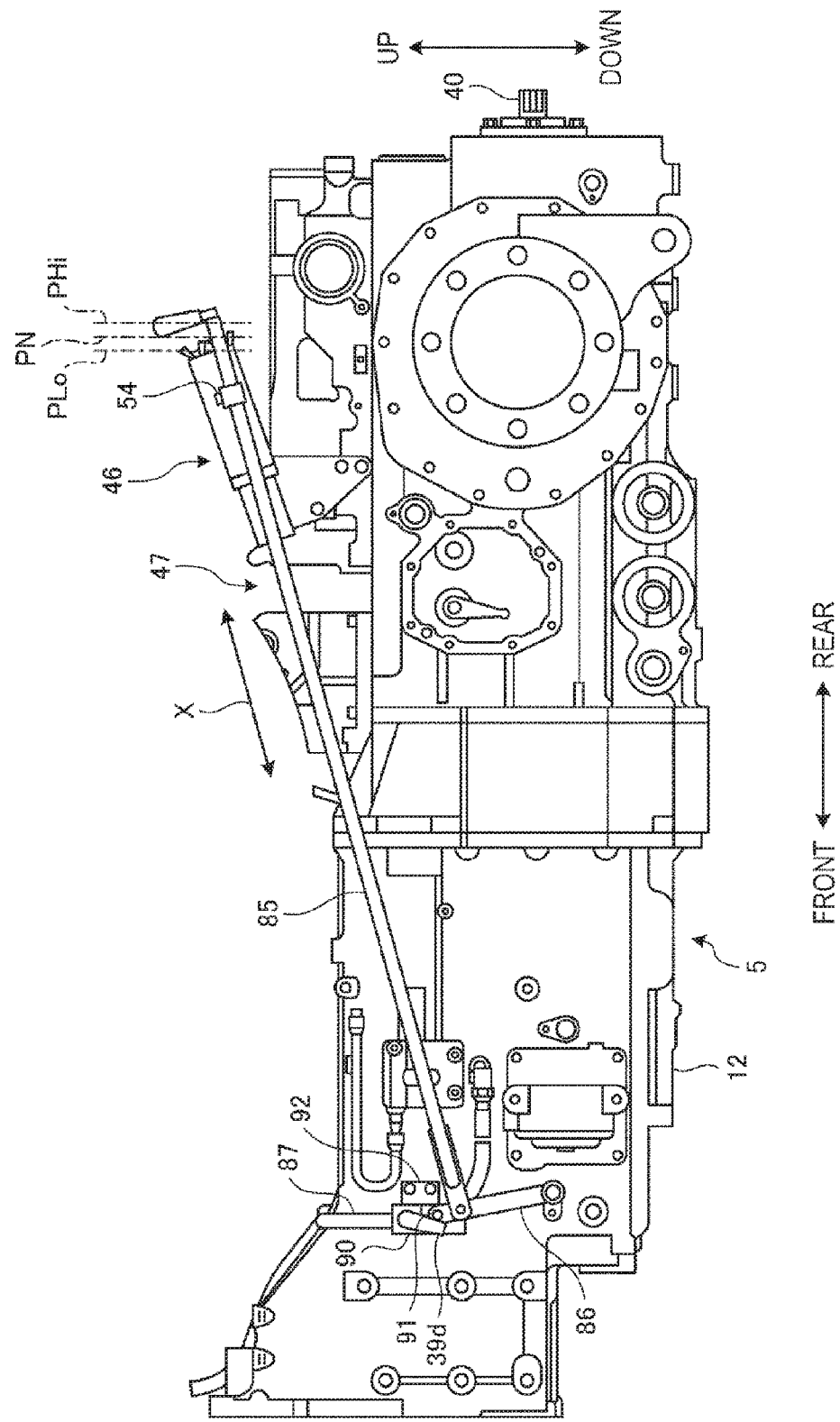
FIG. 14 is an explanatory view showing an operation of operating the PTO gear shift operation lever toward a neutral position.
Figure 15:
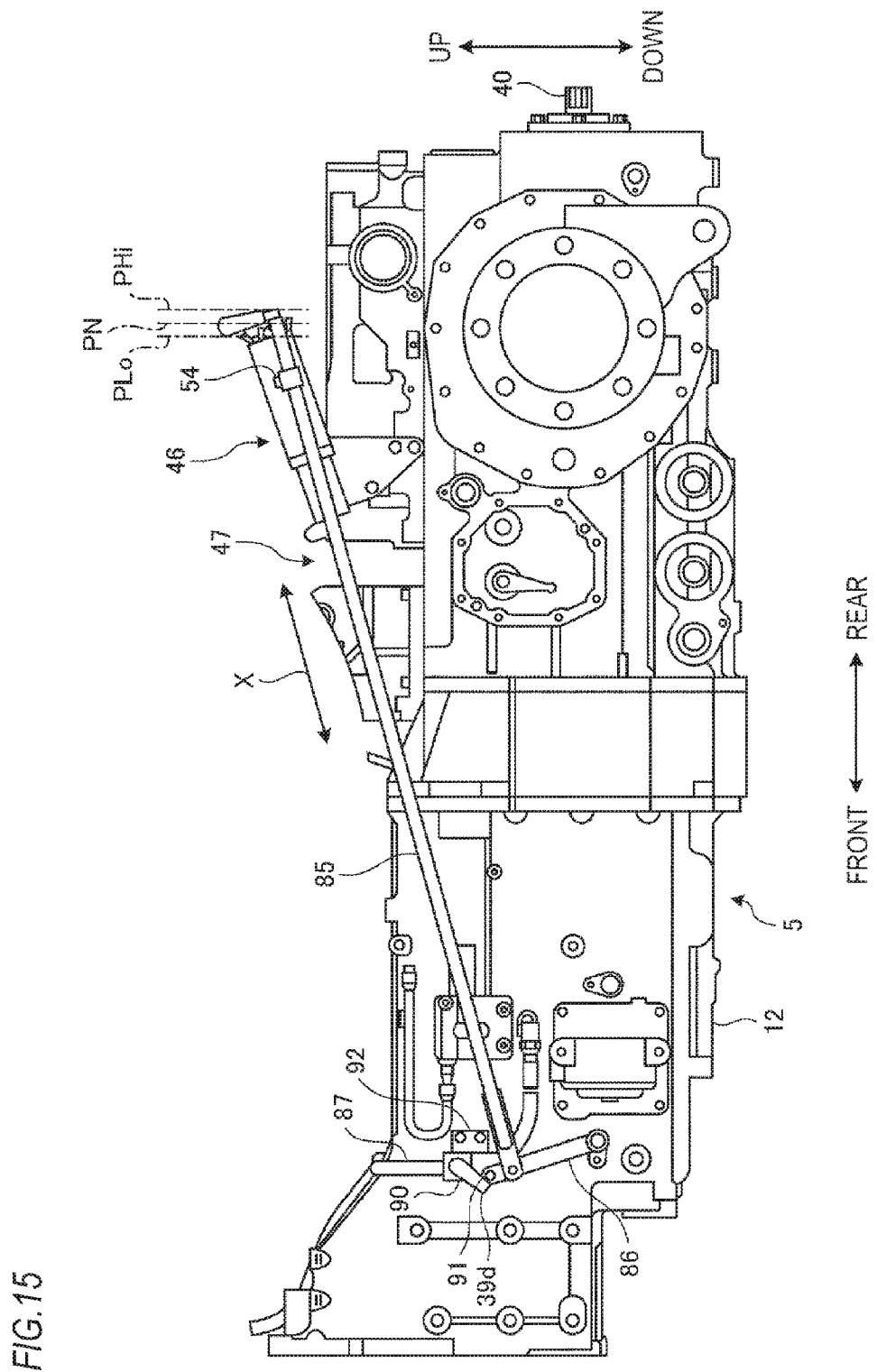
FIG. 15 is an explanatory view showing an operation of operating the PTO gear shift operation lever toward a low-speed position.

Next, the PTO gear shift operation unit 47 will be described in detail with reference to FIGS. 12 to 15. FIG. 12 is an explanatory view showing arrangement of a transmission case 12. FIG. 13 is an explanatory view showing an operation of operating the PTO gear shift operation unit 47 toward a high-speed position. FIG. 14 is an explanatory view showing an operation of operating the PTO gear shift operation unit 47 toward a neutral position. FIG. 15 is an explanatory view showing an operation of operating the PTO gear shift operation unit 47 toward a low-speed position. Meanwhile, in FIG. 12, the front wheels 2, the rear wheels 3 and the rear fender cover are omitted for convenience for explanation. As shown in FIG. 12, the transmission case 12 as described above is arranged below the floor 95 in the vehicle body rear portion 1R. The PTO gear shift operation unit 47 is arranged on a left surface of the transmission case 12.

As shown in FIGS. 12 to 15, the PTO gear shift operation lever 47, which is the PTO gear shift operation unit, is intended to perform gear-shifting of the PTO drive mechanism 20 and is movably supported along a gear shift operation direction on the cylindrical case 51 in the vehicle body rear portion 1R via the storage unit 46. Herein, the gear shift operation direction of the PTO gear shift operation lever 47 refers to a direction inclined with respect to a horizontal direction and typically corresponds to a direction along the center axis of the cylindrical case 51. In other words, the gear shift operation direction of the PTO gear shift operation lever 47 is a direction inclined downward with respect to the horizontal direction as it goes from the rear to the front. The PTO gear shift operation lever 47 is provided with a rod portion 85 extending from the front to the rear along the gear shift operation direction. The rod portion 85 is arranged on the left side of the cylinder case 48, specifically on the left side of the storage unit 46 and has a main body of the PTO gear shift operation lever 47 provided on a rear end portion thereof. The PTO gear shift operation lever 47 is configured so that the rod portion 85 is supported to be slidable along the gear shift operation direction (a direction of an arrow X in FIGS. 13 to 15) by the slide guide portion 54 provided on the cylindrical case 51. Therefore, the PTO gear shift operation lever 47 is supported on the cylinder case 48 via the bracket 50, the cylindrical case 51 of the storage unit 46, the slide guide portion 54 and the like, so that the PTO gear shift operation lever 47, together with the rod portion 85, can be moved along the gear shift operation direction in accordance with a gear shift operation.

The PTO gear shift operation lever 47 is arranged so that a base end thereof is connected to the PTO gear shift mechanism 39 and a distal end is located at a location allowing operation by an operator. The PTO gear shift operation lever 47 is provided with a shifter arm 86 on an end portion of the rod portion 85 opposite to an end portion, on which the main body of the PTO gear shift operation lever 47 is provided. The shifter arm 86 is intended to move the shifter 39d of the PTD gear shift mechanism 39 (see FIG. 5) in accordance with a gear shift operation of the PTO gear shift operation lever 47. As the PTO gear shift operation lever 47, together with the rod portion 85, is moved in the gear shift operation direction, the shifter arm 86 can be pivoted to move the shifter 39d toward any one of the Hi (high-speed) position, the Lo (low-speed) position and the neutral position via a pin 91.

The PTO gear shift operation lever 47, together whit the rod portion 85, can be moved to a high-speed position Phi, a neutral position PN and a low-speed position PLo in accordance with a gear shift operation. As shown in FIG. 13, the high-speed position Phi of the PTO gear shift operation lever 47 refers to a position where the shifter 39d is moved to the Hi position and thus the PTO gear shift mechanism 39 (see FIG. 5) is in the high-speed state to rotationally drive the PTO shaft at a higher speed. As shown in FIG. 14, the neutral position PN of the PTO gear shift operation lever 47 refers to a position where the shifter 39d is moved to the neutral position and the PTO gear shift mechanism 39 is in the neutral state. As shown in FIG. 15, the low-speed position PLo of the PTO gear shift operation lever 47 refers to a position where the shifter 39d is moved to the Lo position and thus the PTO gear shift mechanism 39 (see FIG. 5) is in the low-speed state to rotationally drive the PTO shaft at a lower speed.

The PTO gear shift operation lever 47 is moved to the low-speed position PLo when the PTO gear shift operation lever 47 is pushed in forward along the gear shift direction relative to the neutral position PN. On the other hand, the PTO gear shift operation lever 47 is moved to the high-speed position PHi when the PTO gear shift operation lever 47 is pulled out rearward along the gear shift direction relative to the neural position PN. As a result, an operator can switch positions of the shifter 39d by performing a gear shift operation of the PTO gear shift operation lever 47 along the gear shift operation direction, thereby switching a gear-shifted state of the PTO gear shift mechanism 39, in other words a rotational driving state of the PTO shaft 40 into any one of the high-speed, low-speed and neutral states.

Also, a PTO gear shift sensor 90 for detecting an operation state of the PTO gear shift operation lever 47 as described above is arranged at a location on the left surface of the transmission case 12, which is located near to the base end of the rod portion 85. The PTO gear shift sensor 90 can detect an operation state of the PTO gear shift operation lever 47 by detecting a position of the shifter 39d.

In the tractor 1, a gear-shifting region of the PTO gear shift mechanism 39 of the PTO drive mechanism 20 is determined based on a detection result of the PTO shaft detection sensor 80. Namely, in a state where one of two types of PTO shafts 40 is being used, the gear-shifting region of the PTO gear shift mechanism 39 is determined based on the other of two types of PTO shafts 40, which is stored in the storage unit 46. In other words, by storing the other of two types of PTO shaft 40, i.e., a PTO shaft 40, which is not being used (not mounted on the vehicle body) in the storage unit 46, the gear-shifting region of the PTO gear shift mechanism 39 corresponding to a PTO shaft 40, which is being used (mounted on the vehicle body), can be determined.

Also, as shown in FIG. 12 to 15, in order to avoid an interference with a hydraulic hose 87 arranged on an outer peripheral surface of the transmission case 12, the PTO gear shift sensor 90 is fixed on the transmission case 12 with a stay interposed between the outer peripheral surface (left surface) of the transmission case 12 and the PTO gear shift sensor 90, and also is arranged between the transmission case 12 and the rod portion 85. Further, the PTO gear shift sensor 90 is arranged below the floor 95 (see FIG. 12), in the rear of a fuel tank 96 (see FIG. 12) and also in the rear of a mounting bracket (not shown), thereby preventing water, mud and the like from being directly smeared thereon. In addition, a harness for the PTO gear shift sensor 90 is clamped on a plate 92 welded on the left surface of the transmission case 12 for mounting the PTO gear shift sensor 90.

Returning to FIG. 5, a power transmission control system of the transmission device 5 of the tractor 1 will be now described. As shown in FIG. 5, the tractor 1 has an ECU (Engine Control Unit) 100 as a control device. A detection result of the PTO shaft detection sensor 80 and a detection result of the PTO gear shift sensor 90 are inputted to the ECU 100. The ECU 100 outputs a signal for engaging or disengaging the PTO clutch mechanism 38 to a PTO clutch solenoid valve 101 based on each of the detection results, thereby controlling the PTO clutch mechanism 38.

The ECU 100 performs a control for prohibiting the PTO clutch mechanism 38 from engaging, if the PTO gear shift sensor 90 detects that the PTO gear shift operation lever 47 is operated to the high-speed position, and also the PTO shaft detection sensor 80 does not detect the low-speed rotation PTO shaft 44.

According to this control, because when attempting to rotate the PTO shaft 40 at a higher speed, a condition for engaging of the PTO clutch is that the low-speed rotation PTO shaft 44 is stored, the low-speed rotation PTO shaft 44 can be prevented from being rotated at a higher speed. Namely, it is possible to prevent an implement from being driven at a rotational speed, which does not correspond to the PTO shaft 40 (in this case, high-speed rotation PTO shaft 44).

Also, the ECU 100 performs a control for prohibiting the PTO clutch mechanism 38 from engaging, if the PTO gear shift sensor 90 detects that the PTO gear shift operation lever 47 is operated to the low-speed position, and also the PTO shaft detection sensor 80 detects the low-speed rotation PTO 44.

According to this control, because when the low-speed rotation PTO shaft 44 is stored in the storage unit 46, it is assumed that the high-speed rotation PTO shaft 43 is connected to a driven portion of an implement, a low-speed driving can be prohibited and thus an inappropriate work can be prevented.

Further, as described above, the PTO gear shift sensor 90 detects only an operation state of the PTO gear shift operation lever 47 corresponding to the high-speed position, or an operation state corresponding to the low-speed position. Also, in a case of the neutral position, a rotational power is not transmitted to the PTO shaft 40. Thus, if the PTO gear shift operation lever 47 is located at the neutral position, engaging of the PTO clutch mechanism 38 needs not to be prohibited, and thus it is sufficient that the PTO gear shift sensor 90 detects one operation state of the PTO gear shift operation lever 47 to the high-speed position or low-speed position. Therefore, the PTO gear shift sensor 90 can be minimized in number and also can be constructed at a low cost.

Figure 16:
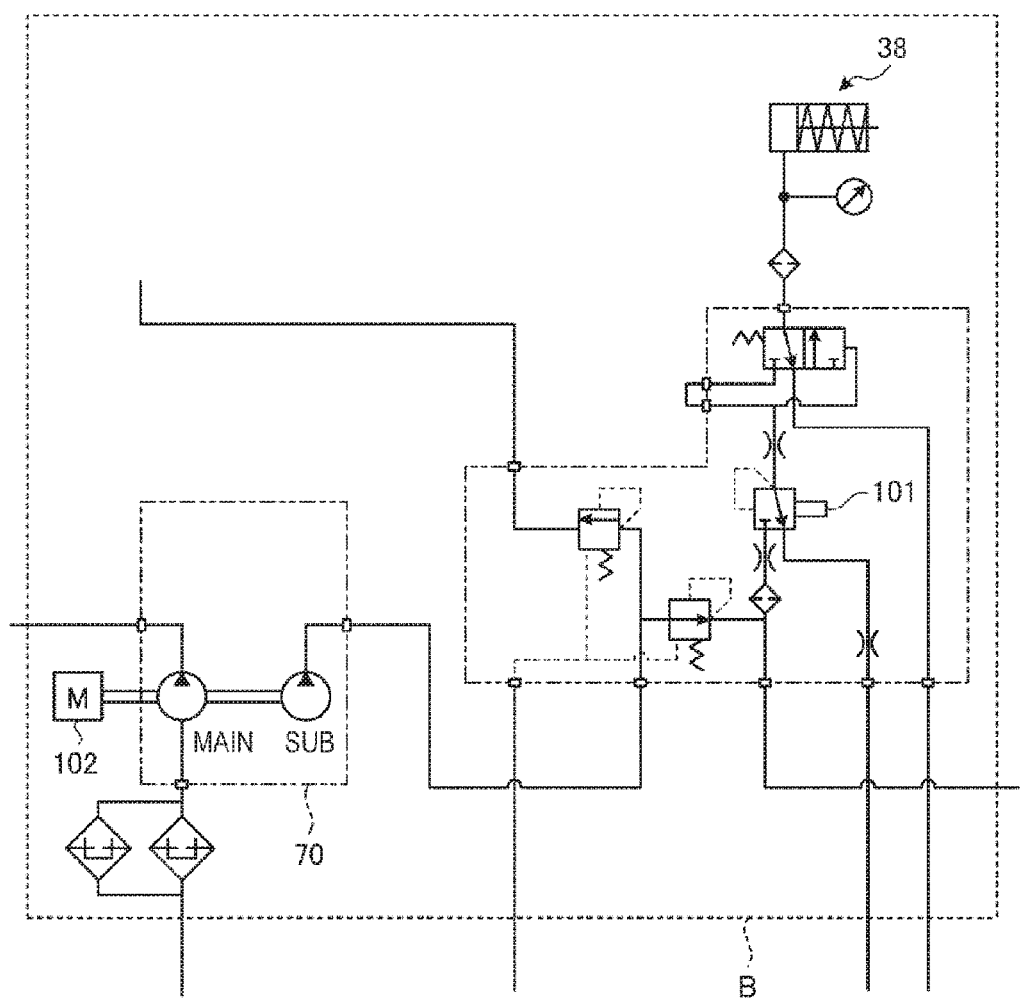
FIG. 16 is an explanatory view of a section B in FIG. 5.

FIG. 16 is an explanatory view (hydraulic power transmission diagram) of a section B in FIG. 5. The gear pump 70 driven by a motor 102 is configured to drive (engage or disengage) the PTO clutch mechanism 38 via the PTO clutch solenoid valve 101 by means of a hydraulic fluid supplied from the gear pump 70. The PTO clutch solenoid valve 101 is controlled by an electric current to engage or disengage the PTO clutch mechanism 38.

Figure 17:
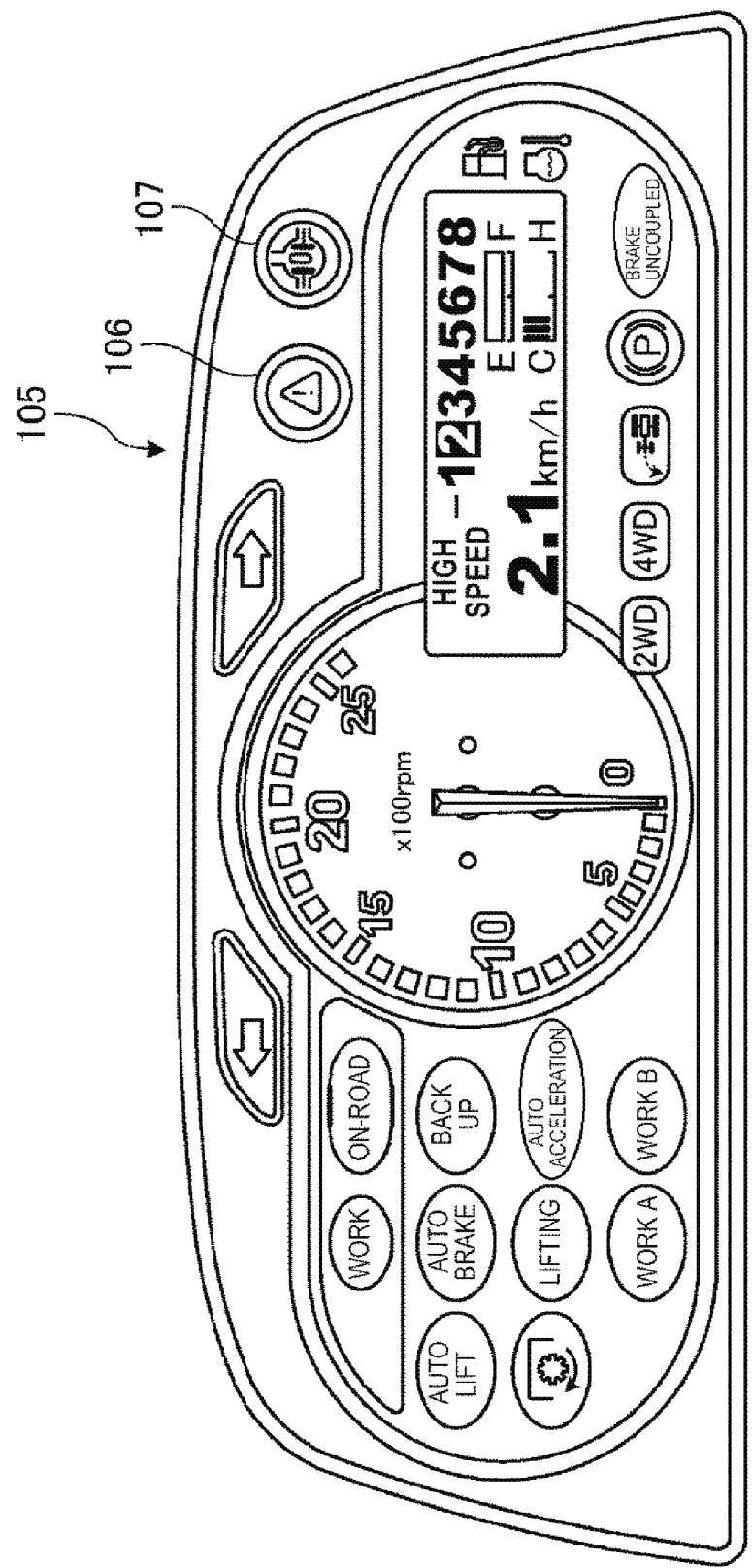
FIG. 17 is an explanatory view of an example of an alarm unit.

FIG. 17 is an explanatory view of an example of an alarm unit. As shown in FIG. 17, a meter panel 105 of the tractor 1 (see FIG. 1) is provided with alarm units 106 and 107. In this example, for example, the alarm unit 106 is configured to be lit or blinked when the PTO shaft 40 (see FIG. 5) is not rotated due to a failure. Also, for example, the alarm unit 107 is configured to be lit or blinked in order to notify a prohibited state where the ECU 100 (see FIG. 5) prohibits the PTO clutch mechanism 38 from engaging and thus the PTO shaft 40 is not rotated. Meanwhile, the alarm units 106 and 107 are controlled by the ECU 100.

Figure 18:
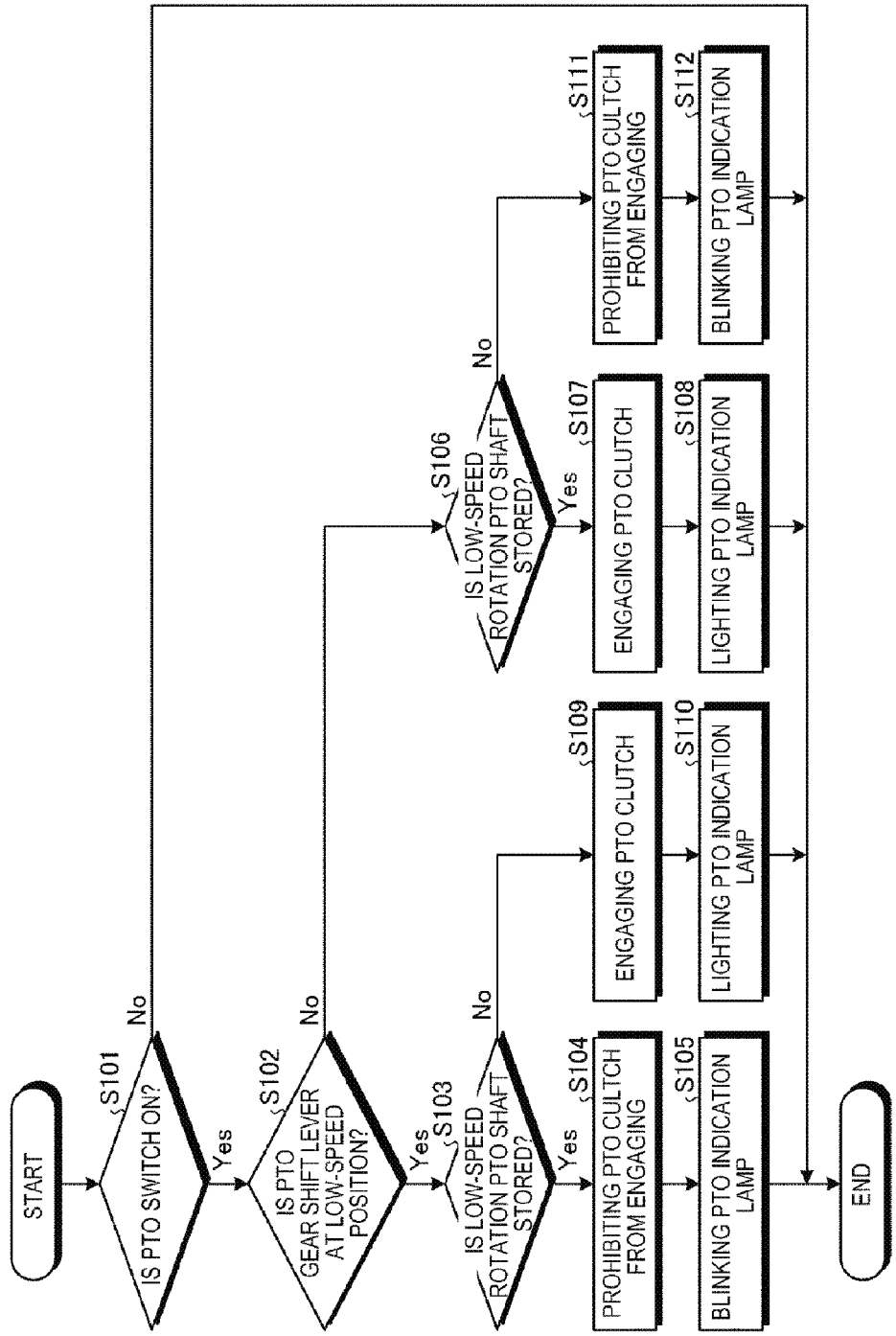
FIG. 18 is a flow chart showing an example of a procedure of a process for controlling engaging of a PTO clutch and alarming.

FIG. 18 is a flow chart showing an example of a procedure of a process for controlling engaging of a PTO clutch and alarming. As shown in FIG. 18, the ECU 100 decides whether of a PTO switch for allowing the PTO shaft 40 to be rotationally driven is turned on or off (Step S101). If the PTO switch is on (Yes, in Step S101), the ECU 100 decides whether or not the PTO gear shift operation lever 47 is operated to the low-speed position (Step S102). If the PTO gear shift operation lever 47 is operated to the low-speed position (Yes, in Step S102), the ECU 100 decides whether or not a PTO shaft 40 stored in the storage unit 46 is the low-speed rotation PTO shaft 44, based on a detection signal from the PTO shaft detection sensor 80 (Step S103). Also, if the PTO shaft 40 stored in the storage unit 46 is the low-speed rotation PTO shaft 44 (Yes, in Step S103), the ECU 100 prohibits the PTO clutch mechanism 38 from engaging (Step S104) and also causes the alarm unit (PTO indication lamp) 107 to be blinked (Step S105), because it is assumed that the high-speed rotation PTO shaft 43 is erroneously mounted.

Further, in Step S101, if the PTO switch is off (No, in Step S101), the ECU 100 ends the process for controlling engaging of the PTO clutch and alarming.

Further, in Step S102, if the PTO gear shift operation lever 47 is not operated to the low-speed position (No, in Step S102), the ECU 100 decides whether or not a PTO shaft 40 stored in the storage unit 46 is the low-speed rotation PTO shaft 44, based on a detection signal from the PTO shaft detection sensor 80 (Step S106). If the PTO shaft 40 stored in the storage unit 46 is the low-speed rotation PTO shaft 44 (Yes, in Step S106), the ECU 100 allows the PTO clutch mechanism 38 to engage (Step S107) and also causes the alarm unit (PTO indication lamp) 107 to be lit (Step S108).

Further, in Step S103, if the PTO shaft 40 stored in the storage unit 46 is not the low-speed rotation PTO shaft 44 (No, in Step S103), the ECU 100 allows the PTO clutch mechanism 38 to engage (Step S109) and also causes the alarm unit (PTO indication lamp) 107 to be lit (Step S110).

In addition, in Step S106, if the PTO shaft 40 stored in the storage unit 46 is not the low-speed rotation PTO shaft 44 (No, in Step S106), the ECU 100 prohibits the PTO clutch mechanism 38 from engaging (Step S111) and also causes the alarm unit (PTO indication lamp) 107 to be blinked (Step S112), because it is assumed that the high-speed rotation PTO shaft 43 is erroneously mounted.

As described above, because the tractor 1 can electrically detect a type of a PTO shaft 40 stored in the storage unit 46 by the PTO shaft detection sensor 80, a PTO gear-shifting is hardly influenced by mud and the like and thus can be reliably performed. Also, because an operation state of the PTO gear shift operation lever 47 can be detected by the PTO gear shift sensor 90, the other PTO shaft 40 and the operation state of the PTO gear shift operation lever 47 can be electrically compared. Therefore, it can be easily found whether or not a PTO shaft 40 corresponding to a rotational speed in accordance with a PTO gear-shifting is mounted. Further, because an operation state of the PTO gear shift operation lever 47 can be detected by the PTO gear shift sensor 90, the other PTO shaft 40 and the operation state of the PTO gear shift operation lever 47 can be electrically compared. Therefore, it can be easily found whether or not a PTO shaft 40 corresponding to a rotational speed in accordance with a PTO gear-shifting is mounted.

Also, because the PTO gear shift sensor 90 is arranged near to the base end of the PTO gear shift operation lever 47, movement of the PTO gear shift operation lever 47 can be directly and reliably detected. Further, it can be reliably detected that a PTO shaft 40 is stored in the storage unit 46. Further, because the holes 57 and 58 provided in the storage unit 46 allow water or oil to be discharged to the outside through the holes 57 and 58, the PTO shaft detection sensor 80 can be prevented from having a failure due to an influence of water, oil and the like. In addition, a PTO shaft 40 subjected to a PTO gear-shifting can be electrically controlled by the PTO shaft detection sensor 80 and the PTO gear shift sensor 90.

Further, when the PTO clutch mechanism 38 is prohibited from engaging, such a prohibited state can be notified to the alarm unit 107, and thus a case, where a PTO shaft 40 is not rotated due to a failure, and a case, where the PTO shaft 40 is not rotated because a prohibition of engaging of the PTO clutch mechanism 38 is controlled by the ECU 100, can be clearly distinguished from each other.

Additional effects and modifications can be easily derived by those skilled in the art. Accordingly, broader aspects of the present invention are not limited to specific details and exemplary embodiments as represented and described above. Therefore, various modifications can be made without departing from the generic spirit and scope of the invention as defined by the appended claims and equivalents thereof.

1: Work vehicle (tractor), 1F: Vehicle body front portion, 1R: Vehicle body rear portion, 2: Front wheel, 3: Rear wheel, 4: Engine, 5: Transmission device, 8: Operator seat, 11: Steering handle, 12: Transmission case, 13: Power train, 15: Forward/reverse switching mechanism, 16: Hi-Lo gear shift mechanism (high-low gear shift mechanism), 17: Main gear shift mechanism, 18: Subsidiary gear shift mechanism, 19: 2WD/4WD selecting mechanism, 20: PTO drive mechanism, 24: First subsidiary gear box, 25: Second subsidiary gear box, 38: PTO clutch (PTO clutch mechanism), 39: Gear shift mechanism (PTO gear shift mechanism), 39*d*: Shifter, 40: PTO shaft, 43: High-speed rotation PTO shaft, 43*a*: Hexagon spline, 43*b*: Attachment end portion, 43*c*: Large-diameter portion, 44: Low-speed rotation PTO shaft, 44*a*: Involute spline, 44*b*: Attachment: end portion, 44*c*: Large-diameter portion, 44*d*: Abutment portion, 46: Storage unit, 47: PTO gear shift operation unit (PTO gear shift operation lever), 50: Bracket, 51: Cylindrical case, 52: Cover, 54: Slide guide portion, 55: Bottom, 56: Middle portion, 57: Hole, 58: Hole, 59: Notch, 80: PTO shaft detection sensor, 81: Sensing portion, 82: Pressing portion, 85: Rod portion, 86: Shifter arm, 90: PTO gear shift sensor, 91: Pin, 92: Plate, 95: Floor, 100: Control device (ECU), 101: PTO clutch solenoid valve, 105: Meter panel, 106: Alarm unit (PTO indication lamp), 107: Alarm unit (PTO indication lamp), Phi: High-speed position, PN: Neutral position, PLo: Low-speed position

The invention claimed is:

1. A work vehicle comprising:
two types of PTO shafts (40) be configured to be selectively connected to a driven portion of a vehicle body;
a PTO drive unit (20) having a gear shift mechanism (39) and configured to rotate a PTO shaft (40), which is connected to the driven portion, of the two types of the PTO shafts (40) at a rotational speed gear-shifted by the gear shift mechanism (39);
a storage unit (46) for storing a PTO shaft (40), which is not connected to the driven portion, of the two types of PTO shafts (40);
a PTO gear shift operation unit (47) for performing gear-shifting of the gear shift mechanism (39);
a PTO shaft detection sensor (80) for detecting a type of the PTO shaft (40) stored in the storage unit (46);
a PTO gear shift sensor (90) for detecting an operation state of the PTO gear shift operation unit (47); and
a control device (100) for deciding a propriety of a combination of a detection value of the PTO shaft detection sensor (80) and a detection value of the PTO gear shift sensor (90).

2. The work vehicle according to claim 1, wherein
the PTO gear shift operation unit (47) is arranged so that a base end thereof is connected to the gear shift mechanism (39) and a distal end thereof is located at a location allowing operation by an operator, and
the PTO gear shift sensor (90) is arranged near to the base end of the PTO gear shift operation unit (47).

3. The work vehicle according to claim 1, wherein
one PTO shaft (40) of the two types of PTO shafts (40) has an abutment portion (44*d*) protruding axially from one end portion thereof,
the storage unit (46) is formed in a cylindrical shape to axially store the PTO shaft (40) therein, and
a pressing portion (82) of the PTO shaft detection sensor (80) is arranged at a location in the storage unit 46, at which the abutment portion (44*d*) is abutted on the pressing portion, when the one PTO shaft (40) is inserted into the storage unit (46), starting with the abutment portion (44*d*).

4. The work vehicle according to claim 2, wherein
one PTO shaft (40) of the two types of PTO shafts (40) has an abutment portion (44*d*) protruding axially from one end portion thereof,
the storage unit (46) is formed in a cylindrical shape to axially store the PTO shaft (40) therein, and
a pressing portion (82) of the PTO shaft detection sensor (80) is arranged at a location in the storage unit 46, at which the abutment portion (44*d*) is abutted on the pressing portion, when the one PTO shaft (40) is inserted into the storage unit (46), starting with the abutment portion (44*d*).

5. The work vehicle according to claim 3, wherein
the PTO shaft detection sensor (80) is arranged on a bottom (55) side of the storage unit (46),
the storage unit (46) is installed so that an insertion direction of the PTO shaft (40) is inclined, and
holes (57, 58) is provided in a lower portion of a circumferential surface of the storage unit (46) in the installed state.

6. The work vehicle according to claim 4, wherein
the PTO shaft detection sensor (80) is arranged on a bottom (55) side of the storage unit (46),
the storage unit (46) is installed so that an insertion direction of the PTO shaft (40) is inclined, and
holes (57, 58) is provided in a lower portion of a circumferential surface of the storage unit (46) in the installed state.

7. The work vehicle according to claim 1, the work vehicle further comprising a PTO clutch (38) for selecting engagement or disengagement of a rotational power to be transmitted to the PTO shaft (40), wherein
the two types of PTO shafts (40) includes PTO shafts (40) of high-speed rotation and low-speed rotation types,
the PTO gear shift operation unit (47) is configured to perform gear-shift operations, which respectively correspond to high-speed, neutral and low-speed positions, on the gear shift mechanism (39), and
the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

8. The work vehicle according to claim 2, the work vehicle further comprising a PTO clutch (38) for selecting engagement or disengagement of a rotational power to be transmitted to the PTO shaft (40), wherein
the two types of PTO shafts (40) includes PTO shafts (40) of high-speed rotation and low-speed rotation types,
the PTO gear shift operation unit (47) is configured to perform gear-shift operations, which respectively correspond to high-speed, neutral and low-speed positions, on the gear shift mechanism (39), and
the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

9. The work vehicle according to claim 3, the work vehicle further comprising a PTO clutch (38) for selecting engagement or disengagement of a rotational power to be transmitted to the PTO shaft (40), wherein
the two types of PTO shafts (40) includes PTO shafts (40) of high-speed rotation and low-speed rotation types,
the PTO gear shift operation unit (47) is configured to perform gear-shift operations, which respectively correspond to high-speed, neutral and low-speed positions, on the gear shift mechanism (39), and
the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

10. The work vehicle according to claim 4, the work vehicle further comprising a PTO clutch (38) for selecting engagement or disengagement of a rotational power to be transmitted to the PTO shaft (40), wherein the two types of PTO shafts (40) includes PTO shafts (40) of high-speed rotation and low-speed rotation types, the PTO gear shift operation unit (47) is configured to perform gear-shift operations, which respectively correspond to high-speed, neutral and low-speed positions, on the gear shift mechanism (39), and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

11. The work vehicle according to claim 5, the work vehicle further comprising a PTO clutch (38) for selecting engagement or disengagement of a rotational power to be transmitted to the PTO shaft (40), wherein the two types of PTO shafts (40) includes PTO shafts (40) of high-speed rotation and low-speed rotation types, the PTO gear shift operation unit (47) is configured to perform gear-shift operations, which respectively correspond to high-speed, neutral and low-speed positions, on the gear shift mechanism (39), and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

12. The work vehicle according to claim 6, the work vehicle further comprising a PTO clutch (38) for selecting engagement or disengagement of a rotational power to be transmitted to the PTO shaft (40), wherein the two types of PTO shafts (40) includes PTO shafts (40) of high-speed rotation and low-speed rotation types, the PTO gear shift operation unit (47) is configured to perform gear-shift operations, which respectively correspond to high-speed, neutral and low-speed positions, on the gear shift mechanism (39), and the control device (100) is configured to control the PTO clutch (38) and also is set so that if the PTO gear shift sensor (90) detects that the PTO gear shift operation unit (47) is operated to the high-speed position, a condition for engaging of the PTO clutch (38) is that the PTO shaft detection sensor (80) detects that a PTO shaft (40) for low-speed rotation is stored.

13. The work vehicle according to claim 7, wherein when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

14. The work vehicle according to claim 8, wherein when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

15. The work vehicle according to claim 9, wherein when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

16. The work vehicle according to claim 10, wherein when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

17. The work vehicle according to claim 11, wherein when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

18. The work vehicle according to claim 12, wherein when the PTO gear shift sensor (90) detects that the PTO gear shift operation unit (47) is operated to the low-speed position, the control device (100) is configured to prohibit the PTO clutch (38) from engaging if the PTO shaft detection sensor (80) detects that a PTO shaft (40) for low-speed rotation is stored.

\* \* \* \* \*